US009538625B2

(12) United States Patent
Szabados et al.

(10) Patent No.: US 9,538,625 B2
(45) Date of Patent: Jan. 3, 2017

(54) METHODS AND SYSTEMS FOR CONTROLLING ADDRESSABLE LIGHTING UNITS

(71) Applicant: Cooper Technologies Company, Houston, TX (US)

(72) Inventors: Barna Szabados, Ancaster (CA); Roumanos Dableh, Oakville (CA)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 66 days.

(21) Appl. No.: 14/195,461

(22) Filed: Mar. 3, 2014

(65) Prior Publication Data

US 2014/0176011 A1 Jun. 26, 2014

Related U.S. Application Data

(63) Continuation of application No. 12/023,694, filed on Jan. 31, 2008, now abandoned.

(60) Provisional application No. 60/887,375, filed on Jan. 31, 2007.

(51) Int. Cl.

*H05B 37/00* (2006.01)
*H05B 37/02* (2006.01)
*G05B 15/02* (2006.01)

(52) U.S. Cl.

CPC ...... *H05B 37/0281* (2013.01); *H05B 37/0254* (2013.01)

(58) Field of Classification Search

CPC . H05B 37/0281; H05B 37/0254; H05B 37/02; G05B 15/02
USPC .................. 700/286, 275; 315/291; 307/140
See application file for complete search history.

(56) References Cited

U.S. PATENT DOCUMENTS 4,064,485 A 12/1977 Leyde
4,510,398 A 4/1985 Culp et al.
4,549,274 A 10/1985 Lerner et al.
4,567,557 A * 1/1986 Burns ............................ 700/16
4,916,328 A 4/1990 Culp
5,357,170 A * 10/1994 Luchaco et al. .............. 315/159

(Continued)

FOREIGN PATENT DOCUMENTS

JP 11045782 2/1999

OTHER PUBLICATIONS

Pansini et al., Guide to Electric Power Generation; Advanced lighting controls: energy saving, productivity, technology and applications, The Fairmont Press, Inc., Edition III, pp. 25, 60, 226, 2006.

(Continued)

*Primary Examiner* — Kenneth M Lo
*Assistant Examiner* — Jason Lin
(74) *Attorney, Agent, or Firm* — Lee & Hayes, PLLC

(57) ABSTRACT

Systems and methods that provide improved control of addressable lighting fixtures. Individual lighting units have assigned schedules defining the power levels for the unit at various times of the day. Adjustments to a scheduled level for each unit may be made depending on predefined exceptions, ambient daylight, conservation commands, override instructions, and boost signals. Individual occupants of the building are associated with sets of individual lighting units. An override command received by the system and associated with a particular individual occupant is applied to the individual lighting units with which the individual occupant is associated.

17 Claims, 12 Drawing Sheets

(56) References Cited

U.S. PATENT DOCUMENTS

| | | | | |
|---|---|---|---|---|
| 5,598,349 | A | 1/1997 | Elliason et al. | |
| 5,644,173 | A | 7/1997 | Elliason et al. | |
| 5,945,993 | A * | 8/1999 | Fleischmann | H05B 37/02 715/771 |
| 6,151,529 | A * | 11/2000 | Batko | 700/28 |
| 6,990,394 | B2 * | 1/2006 | Pasternak | 700/295 |
| 7,307,542 | B1 * | 12/2007 | Chandler et al. | 340/9.16 |
| 7,313,465 | B1 * | 12/2007 | O'Donnell | 700/291 |
| 7,346,433 | B2 * | 3/2008 | Budike, Jr. | 700/277 |
| 7,460,930 | B1 * | 12/2008 | Howell et al. | 700/295 |
| 7,545,285 | B2 * | 6/2009 | Shuey et al. | 340/870.02 |
| 7,706,928 | B1 * | 4/2010 | Howell et al. | 700/295 |
| 7,711,565 | B1 * | 5/2010 | Gazdzinski | 704/270 |
| 8,156,350 | B2 * | 4/2012 | Freitas | 713/300 |
| 2002/0010518 | A1 * | 1/2002 | Reid et al. | 700/31 |
| 2002/0016639 | A1 * | 2/2002 | Smith et al. | 700/9 |
| 2003/0158632 | A1 * | 8/2003 | Nierlich et al. | 700/295 |
| 2004/0123550 | A1 * | 7/2004 | Hartman | 52/720.1 |
| 2004/0225811 | A1 * | 11/2004 | Fosler | 710/305 |
| 2005/0043862 | A1 * | 2/2005 | Brickfield et al. | 700/295 |
| 2005/0052275 | A1 * | 3/2005 | Houle | 340/5.61 |
| 2005/0097162 | A1 * | 5/2005 | Budike, Jr. | 709/201 |
| 2006/0025891 | A1 * | 2/2006 | Budike, Jr. | 700/275 |
| 2007/0061050 | A1 * | 3/2007 | Hoffknecht | 700/291 |
| 2007/0205915 | A1 * | 9/2007 | Shuey et al. | 340/870.02 |
| 2008/0218334 | A1 * | 9/2008 | Pitchers et al. | 340/539.1 |
| 2008/0258646 | A1 * | 10/2008 | Beij et al. | 315/291 |

OTHER PUBLICATIONS

Internet article, "DALI Enhances Building Automation", www.AutomatedBuilding.com, 5 pp., Dec. 7, 2006.

U.S. Official Action dated Oct. 2, 2013 in U.S. Appl. No. 12/023,694.

U.S. Official Action dated Sep. 28, 2012 in U.S. Appl. No. 12/023,694.

U.S. Official Action dated Apr. 24, 2012 in U.S. Appl. No. 12/023,694.

U.S. Official Action dated Oct. 15, 2010 in U.S. Appl. No. 12/023,694.

U.S. Official Action dated Mar. 5, 2010 in U.S. Appl. No. 12/023,694.

* cited by examiner

METHODS AND SYSTEMS FOR CONTROLLING ADDRESSABLE LIGHTING UNITS

CROSS-REFERENCE TO RELATED APPLICATIONS

This application is a continuation of co-pending U.S. application Ser. No. 12/023,694 filed Jan. 31, 2008 entitled "Methods and Systems for Controlling Addressable Lighting Units," which claims the benefit of U.S. provisional patent application No. 60/887,375, filed on Jan. 31, 2007, which are both expressly incorporated herein by reference in their entirety.

FIELD OF THE INVENTION

The present invention relates to methods and systems for controlling addressable lighting units, and, in particular, to methods and systems for controlling and managing a plurality of lighting units in a building or other facility.

BACKGROUND OF THE INVENTION

Building management systems have become increasingly sophisticated to provide better control over lighting schemes and to improve energy conservation.

In many industrial and office buildings, lighting is governed by a schedule such that it turns on and off at specific times of day or on specific days. For example, the lights may be configured to turn on at a certain time in the morning, such as 6 a.m. local time, and turn off in the evening, for example at 7 p.m. In some cases, the schedule will provide for different lighting schemes. By way of example, all lights may be fully on during the working hours and off in the night and on weekends, but may be reduced to 50% dimmed status for a few hours in the evening at times when cleaning staff may be present in the building.

In addition to scheduled control of lighting, individual units or sections of units may adjust their dimming levels based on a light sensor present in the area of the units in order to take advantage of natural light in areas near windows to conserve energy. Typically, the light sensor is directly connected to one or more of the units and provides the units with an indication of the natural light levels. The units dim their scheduled levels based on the readings from the light sensor.

Systems exist that allow occupants to override a lighting schedule, for example if an occupant is working late or on weekends during a time when the lights are normally dimmed or off. Typical systems allow an occupant or a building supervisor to input a command to the lighting control system through a touch-tone telephone system, a Web interface, or through some other user input interface. The command may instruct the system to turn on the lights for a particular floor or, if the floor is sufficiently large to be divided into sections, in a particular section of the floor. To the extent that the occupant requires access to more than one section or floor, the occupant instructs the system to turn on the lights in multiple sections or floors. The override command may be associated with a time-out value, such that the scheduled dimming or off status resumes after a preset time period, such as for example 2 hours.

It would be advantageous to provide for improved methods and/or systems for controlling addressable lighting fixtures.

SUMMARY OF THE INVENTION

The present application describes systems and methods that provide improved control of addressable lighting fixtures.

In one aspect, the present application discloses a system for controlling addressable lighting units within a building, the building having at least one tenant, the tenant being associated with a plurality of occupants, the units each having one or more light fixtures, and each unit having an addressable switch connected to a control bus. The system includes a controller having one or more control outputs for transmitting commands to the units via the control bus, and a memory device. The memory device includes a unit record for each unit, each record specifying unit-specific properties, and an occupant record for each of the occupants, the occupant record identifying one of the occupants and associating one or more of the units with the identified occupant.

In another aspect, the memory of the foregoing system may, in some cases, include one or more Work Points, each Work Point identifying one or more units. The memory may further contain an association between one of the occupants and one of the Work Points, and the system may include an override module for receiving an override command associated with the one of the occupants and for causing the units within the one of the Work Points to be set to an override power level based on the association.

In yet another aspect, the present application describes a system for controlling addressable lighting units within a building, the building having at least one tenant, the tenant being associated with a plurality of occupants, the units each having one or more light fixtures, each unit having an addressable switch connected to a control bus. The system includes a controller having one or more control outputs for transmitting commands to the units via the control bus and being configured to receive an instruction associated with one of the occupants; and a memory device storing a unit record for each unit, each record specifying unit-specific properties, an occupant record for each of the occupants, each occupant record identifying one of said occupants and associating a subset of the units with the occupant, wherein the controller is configured to generate the commands to the subset of the units in response to the light instruction and based on the association in the occupant record between said one of the occupants and the subset of the units.

In a further aspect, the present application describes a method for setting light levels for addressable lighting units within a building, the building having at least one tenant, the tenant being associated with a plurality of occupants, the units each having one or more light fixtures, each unit having an addressable switch connected to a control bus. The method includes receiving a lighting instruction associated with one of the occupants; reading an occupant record identifying said one of the occupants and associating said one of the occupants with a subset of the units; and generating commands to the set of units in response to the lighting instruction and based on the association in the occupant record.

In another aspect, the present application discloses a method for setting light levels for addressable lighting units within a building. The method includes associating a schedule with each lighting unit, each associated schedule defining power levels for the unit for specific times of day; and for each lighting unit, determining a current power level for the unit based on its associated schedule and a current time of day, and instructing the unit to user the current power level.

In yet another aspect, the present application provides a system for setting light levels for addressable lighting units within a building. The system includes means for associating a schedule with each lighting unit, each associated schedule defining power levels for the unit for specific times of day; means for determining, for each lighting unit, a current power level for the unit based on its associated schedule and a current time of day; and means for instructing the unit to use the current power level.

In a further aspect, the present application provides a system for controlling addressable lighting units within a building, the units each having one or more light fixtures, and each unit having an addressable switch connected to a control bus. The system may include a light control interface having one or more control outputs for transmitting commands to the units via the control bus, a control module for determining a power level for each unit and for causing the light control interface to send power level commands to the units, and a light sensor located external to the building and having an output in communication with the control module for providing light level data to the controller. The system also includes a memory device storing a unit record for each unit, each record specifying unit-specific properties including a daylight savings weight, wherein the daylight savings weight associates light levels with power levels for the unit. The control module includes a component for determining a daylight level based on the light level data and a component for determining the power level for each unit based upon the daylight level and the power level associated with one of the light levels corresponding to the daylight level.

In a further aspect, the above system may also include an interior sensor for determining the status of one or more blinds, and the control module may be configured to adjust the power level of one or more units based on the status of the one or more blinds.

In yet another aspect, the present application discloses a system for controlling addressable lighting units within a building, the units each having one or more light fixtures, each unit having an addressable switch connected to a control bus. The system may include a light control interface having one or more control outputs for transmitting commands to the units via the control bus, a control module for determining a power level for each unit and for causing the light control interface to send power level commands to the units, and a memory device storing a unit record for each unit, each record specifying unit-specific properties including a load shedding weight, wherein the load shedding weight associates emergency levels with power levels for the unit. The system also includes a conservation demand module for implementing conservation demand instructions, the module comprising a component for receiving a conservation demand associated with a selected one of the emergency levels, and for causing the control module to set the power levels for at least some of the units based upon the power levels associated with the selected one of the emergency levels.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which.

Similar reference numerals are used in different figures to denote similar components.

DESCRIPTION OF SPECIFIC EMBODIMENTS

In some example embodiments below a control system is described for controlling lighting units in a building or other facility. It will be appreciated that the control system is not limited to installations within a single building. The control system may be employed to control multiple buildings, for example as part of a campus or industrial park. The buildings need not be associated or even co-located. Moreover, the control system may be used to control lighting units disposed indoors or outdoors. For example, the control system may be used in connection with stadiums, convention centers, parks, or any other indoor/outdoor facilities. The control system and/or the lighting units are not intended to be limited to use in association with any of the buildings or facilities described herein.

In the case of addressable lighting systems, there are a number of standards and protocols for control signaling. Each lighting unit may include an addressable ballast and one or more lighting fixtures. The addressable ballast may connect and disconnect the fixtures from the power mains. In many cases, the ballast may regulate voltage or current applied to the fixture to control dimming. The various ballasts that may be used in an addressable lighting system will be appreciated by those of ordinary skill in the art, and it will be understood that the present invention is not limited to any particular type of ballast or fixture.

Addressable lighting systems typically include an interface or protocol to transmit commands over links to particular units. Example commands may instruct a unit to turn on, turn off, or dim to a certain percentage of full power. In some cases, the following description may refer to a "power level" or "dimming level". Although a "power level" might imply a positive percentage of full power and a "dimming level" might imply an amount by which a unit should be reduced from full power, the use of either implementation is application-specific and the present description may use the terms interchangeably. Other commands will be understood by those skilled in the art of addressable lighting control.

One protocol for interfacing with lighting units is the Digital Addressable Lighting Interface (DALI) standard. While embodiments of the control system described below may use a DALI bus for sending commands and receiving data from lighting units, those skilled in the art will appreciate that other control standards, protocols, or interfaces may be used in other embodiments.

Control System

Figure 1:
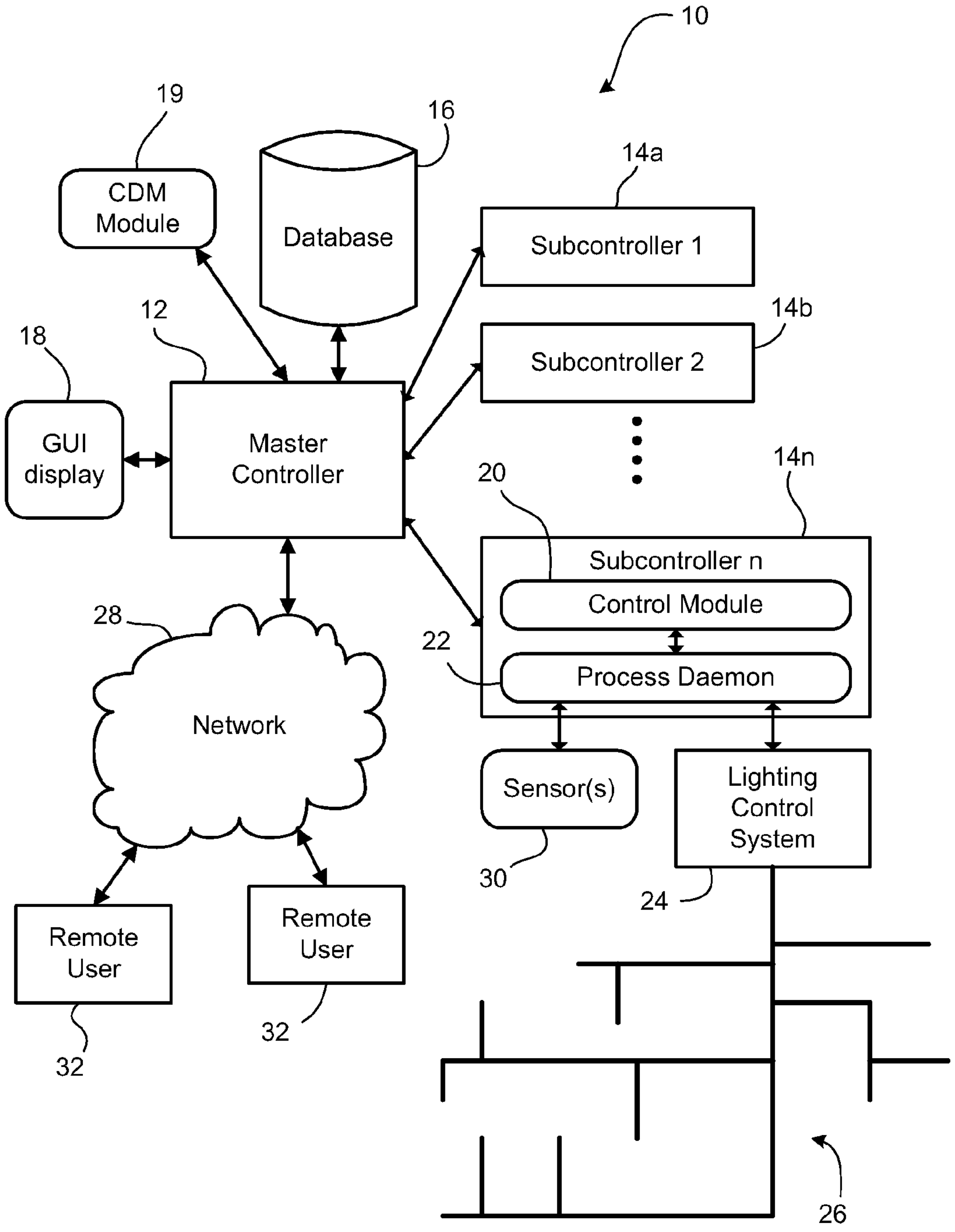
FIG. 1 shows, in block diagram form, an embodiment of a control system for addressable lighting units within a building or other facility.

Reference is first made to FIG. 1, which shows, in block diagram form, an embodiment of a control system 10 for addressable lighting units within a building or other facility. The control system 10 includes a master controller 12 and one or more subcontrollers 14 (shown individually as 14*a*, 14*b*, . . . , 14*n*). The master controller 12 is connected to a non-volatile memory, which in one case is configured as a database 16. The master controller 12 may also be connected to a display device 18. The display device 18 may comprises a graphical user interface (GUI) for displaying information to a user and for receiving user input and commands.

The configuration of the control system 10 allows for significant distributed processing of the various commands and controls related to addressable lighting. Each subcontroller 14 controls the state of a set of lighting units. In one embodiment, the set of lighting units may be common to a floor of the building, such that each subcontroller 14 is specific to at least one floor; although it will be appreciated that the division of sections of the building or facility amongst the subcontrollers 14 need not be by floor. In one example embodiment, the control system 10 may have a single subcontroller 14.

Each subcontroller 14 determines the state of each unit under its control and provides instructions to the units. In particular, the subcontroller 14 outputs commands to a lighting control interface 24. In one embodiment, the lighting control interface 24 may be implemented in accordance with a standardized interface protocol, such as the DALI protocol; however, the interface 24 may be proprietary in some embodiments. The lighting control interface 24 is connected to one or more control buses 26, which are connected to the lighting units. The lighting control interface 24 includes a bus controller for powering the control buses 26 and transmitting command instructions on the control buses 26. The command instructions may, for example, direct one or more of the lighting units to turn off, turn on, or dim to a specified power level.

The lighting control interface 24 receives instructions from the subcontroller 14 and, in some embodiments, may provide feedback data to the subcontroller 14. Some embodiments of the lighting control interface 24 may receive feedback information regarding the state of the lighting units and may relay the feedback information to the subcontroller 14. The subcontroller 14 may also include one or more input ports connected to one or more inputs 30 for receiving data regarding the lighting environment. Example inputs include sensors, switches, buttons, etc. The inputs 30 may, for example, include light sensors that output an analog signal representative of the ambient light level in the area of the sensor.

In one embodiment, each subcontroller 14 may be implemented as a daemon 22 and a control module 20. The daemon 22 is a background process or service that manages communications between the control module 20, the lighting control interface 24 and the various other components of the system 10, including the master controller 12.

The control module 20 determines the status of each lighting unit under its control at any point in time. It performs the necessary calculations to determine the dimming level for each unit dependent upon the time and the current schedule, taking into account any overrides, exceptions, etc., as will be described in greater detail below.

The database 16 contains data regarding the lighting units, their properties, their association with a particular subcontroller 14, their dimming schedule, and additional information, as will be described in greater detail below. The data for lighting units associated with a particular subcontroller 14 is uploaded to the control module 20 via the daemon 22 upon initialization of the system 10. The control module 20 performs the function of determining the status and dimming level of each unit and issuing the necessary commands to the lighting units, via the daemon 22.

The master controller 12 provides users with a high level command set for managing the control modules 12. For example, the master controller 12 may stop, start, or reconfigure each of the control modules 20. Also, through the display device 18, a user or administrator may request reports, request overrides, and issue load shedding commands, among other things. The master controller 12 may also be accessible by a remote client 32 via a network 28. The network 28 may include a LAN, WAN, WLAN, any combination thereof, or any other data network, including the Internet. The remote client 32 and/or GUI display 18 may be implemented on a variety of devices, such as, for example, a personal computer, a handheld wireless device, a personal digital assistant, or any other suitable computing device.

Figure 2:
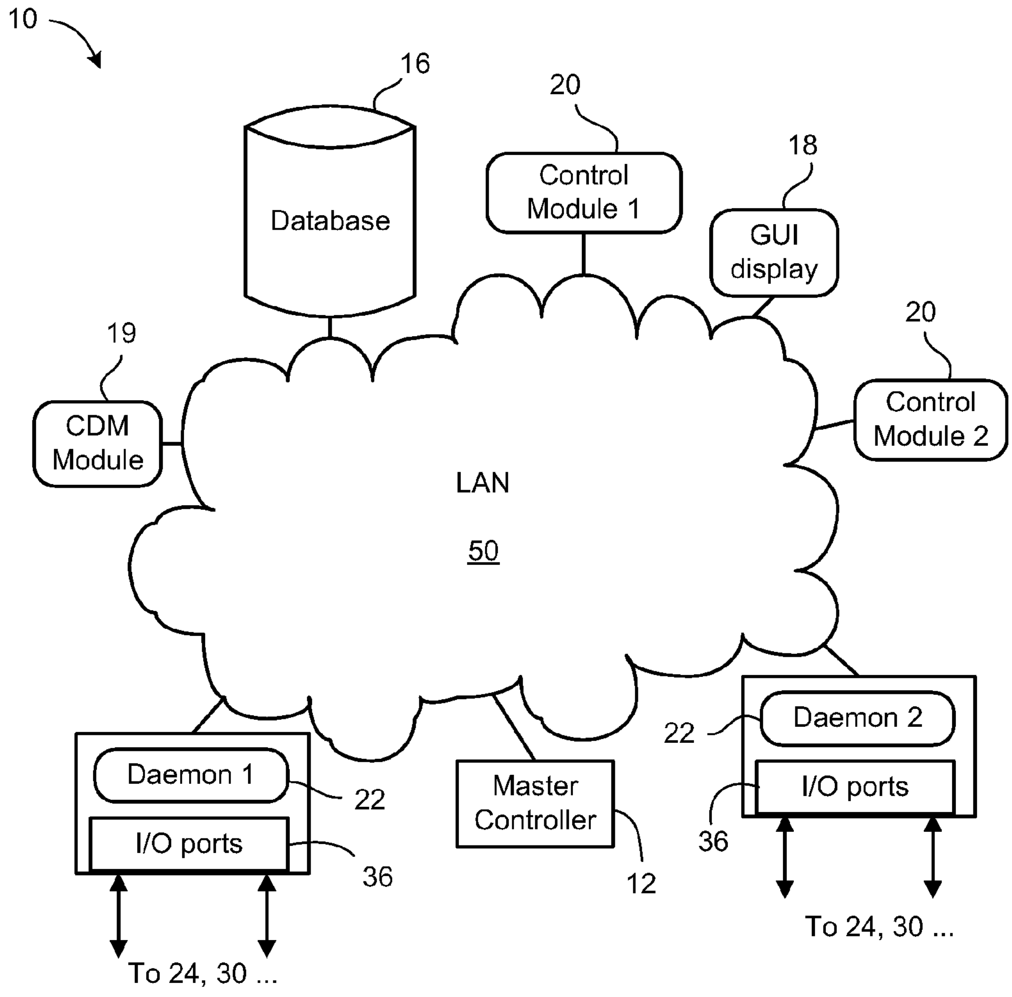
FIGS. 2 and 3 both diagrammatically show embodiments of the system of FIG. 1 implemented over a local area network.
Figure 3:
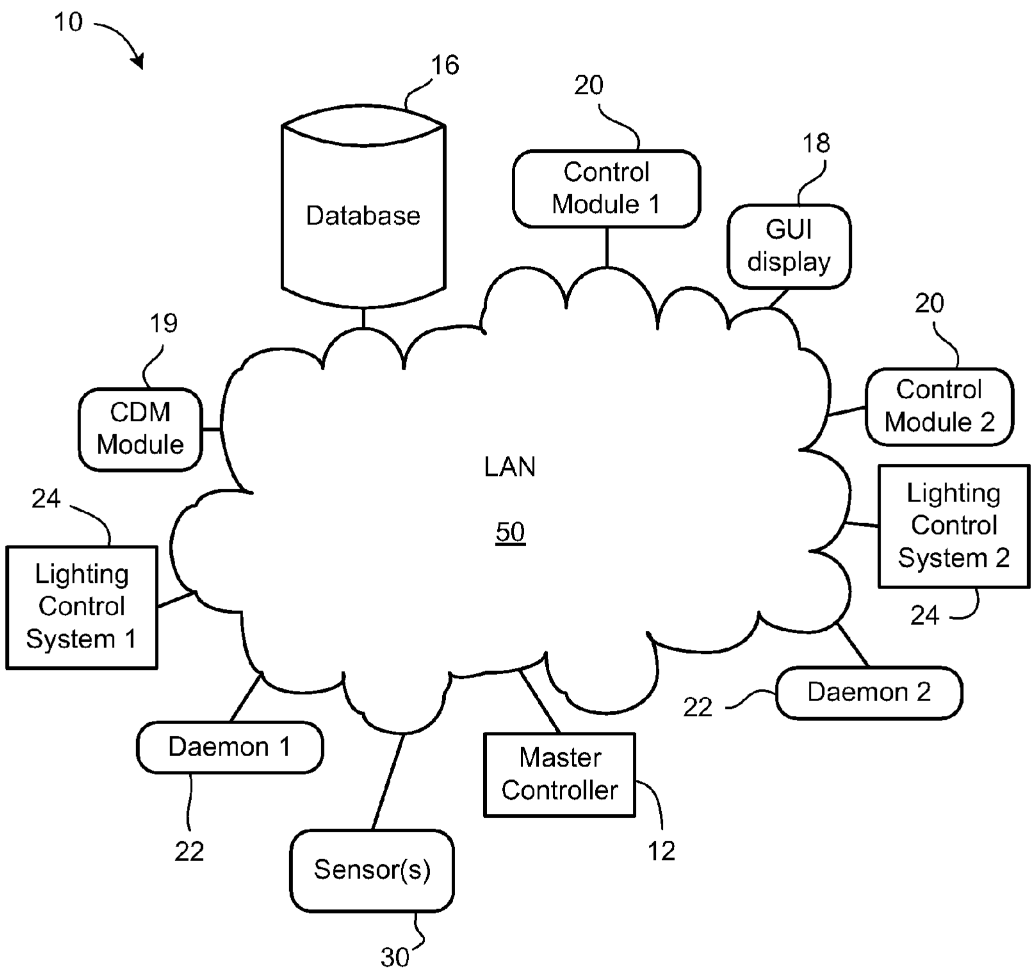

Reference is now made to FIGS. 2 and 3, which both diagrammatically show embodiments of the system 10 implemented over a local area network (LAN) 50. In both cases, the control modules 20 are implemented on separate machines from their corresponding daemons 22. In the embodiment shown in FIG. 2, the inputs 30 and the lighting control interface 24 rely on RS232 serial ports 36. Accordingly, the daemon 22 is implemented on the same machine as the serial ports 36 with which it is to interface. It will be appreciated that the GUI 18 does not necessarily run on the same machine as the master controller 12.

In FIG. 3, the lighting control interface 24 is a DALI bus interface implemented using an Ethernet-enabled programmable logic controller (PLC). Accordingly, the lighting control interfaces 24 and the daemons 22 are shown in FIG. 3 as being implemented on separate machines, all connected to the LAN 50.

It will be appreciated that the system 10 architecture is such that it may be as distributed as the application demands. In some cases, the subcontrollers 14, including the daemons 22 and the control modules 20, may be implemented on a single machine. In others, each subcontroller 14 may be on a different machine. In still others, the daemons 22 may run on different machines from the control modules 20. In yet other embodiments, the daemons 22, control modules 20, and master controller 12, may each be implemented on any machine reachable by way of Ethernet connection. For example, one embodiment of the system 10 may include a daemon 22 located in Australia, a control module 20 located in Canada, a master controller 12 located in the United States, and a remote client GUI located in the United Kingdom, all connected via the Internet.

It will also be appreciated that the architecture of the system 10 permits easy scalability, whereby additional subcontrollers 14 may be added to an existing installation.

Control System Operation

To assist with understanding the following description of the control system's operation, a set of terms will be defined.

A "Unit" refers to a lighting unit 28, which is the smallest granularity in the control architecture. The lighting unit has a unique address. The Unit may include more than one ballast and each ballast may include more than one lamp. Each Unit has a set of properties, some of which are "hard" properties not inherited from a parent grouping, and others may be "soft" properties that are inheritable from a parent grouping. If a "soft" property is explicitly defined for a Unit, then the explicitly defined value applies; otherwise, it inherits the value of the parent grouping. Parent groupings may be made by area, floor, building, or at other levels depending on the specific implementation.

A "Schedule" refers to a set of times and light levels. The light levels are indicated by a percentage of full power for a Unit. For example, a light level may be 50% of full power. Each Unit, or group of Units, may have a Schedule assigned. An example Schedule includes one or more times and a light level corresponding to each time. For example, a Schedule may take the form:

[8 50] [9:30 70] [18:15 40] [19 0]

This example Schedule indicates that at 8 a.m. the light level should be set to 50% of maximum. At 9:30 a.m. the light level should be set to 70% of maximum, and at 6:15 p.m. the light level should be reduced to 40% of maximum. At 7 p.m. the light should be turned off.

An "Exception" is a predefined property that overrides the Schedule. Exceptions are generally related to the date or day. Exceptions may specify a date or categories of dates and a schedule. Exceptions may be used, for example, to provide a different Schedule for weekends or holidays. In one example embodiment, the dates for an Exception may be encoded as follows:

| | |
|---|---|
| Day of the week: | /1 to /7 = Sunday to Saturday |
| Month: | 1 to 12 |
| Year: | 01 onwards |

Example dates may be [/7], which would indicate the Exception applies every Saturday; [25 12], which indicates Christmas Day; and [15 06 07], which indicates Jun. 15, 2007.

A "date" within an Exception may be combined with a schedule property to define the Exception. For example:

| | |
|---|---|
| scheduleOff = [0 0] | |
| [/1] scheduleOff | indicates the lights should be off every Sunday |
| [4 7] sheduleOff | indicates the lights should be off every July 4th |

The term "Boost" refers to a signal generated by a physical pushbutton or switch the lighting environment (a "hard" boost) or a signal generated by a software request (a "soft" boost). The software request may, for example, be initiated through an icon that the user clicks in an interface. The Boost signal is a specific override request associated with a predefined set of lights. For example, a physical pushbutton may have its boost signal associated with a set of Units in physical proximity to the pushbutton. In another example, an occupancy sensor may generate a boost signal.

The term "Proxy" is a predefined property of a Unit or group of Units that prescribes the response of the Unit or group of Units to a specific Boost signal. The Proxy property may include both a power level or lighting level at which the unit(s) is to be set in response to a boost signal, and a duration for which the boost is to last. For example, in a washroom at a time during which the lights are scheduled to be off, a light switch or occupancy sensor may be activated to supply a boost signal. The Units within the washroom may have a Proxy property of the form [80 15] [40 5]. This property specifies that the lights are to be turned on to an 80% power level for fifteen minutes when a boost signal is received. Following expiration of the first fifteen minutes, the lights are to be dimmed to a 40% power level for five minutes. Finally, following the five minutes, they are turned off.

In addition to these properties or parameters, each Unit may have associated layout parameters, specifying its location. In some cases, the control system 10 may include graphical representations accessible through, for example, the GUI 18 through which the physical layout of various lighting units may be visually displayed. Individual units may be selectable within the GUI 18 layout to obtain data regarding the unit's properties and status. Other properties or parameters that may be defined or associated with each Unit include:

Watts=maximum power consumption

Minimum=minimum power level

Maximum=maximum power level

Scheduled Level=determined by Schedule and current time

Current Level=current operating level of the Unit

Additional parameters, variables, or properties may also be used, some of which are discussed in further detail below.

It will be appreciated that different implementations of the control system 10 may structure the properties in different manners. The precise data structure used to define the properties of Units and their association with a group of other units, specific boost signals, etc., may change depending on the embodiment.

Figure 4:
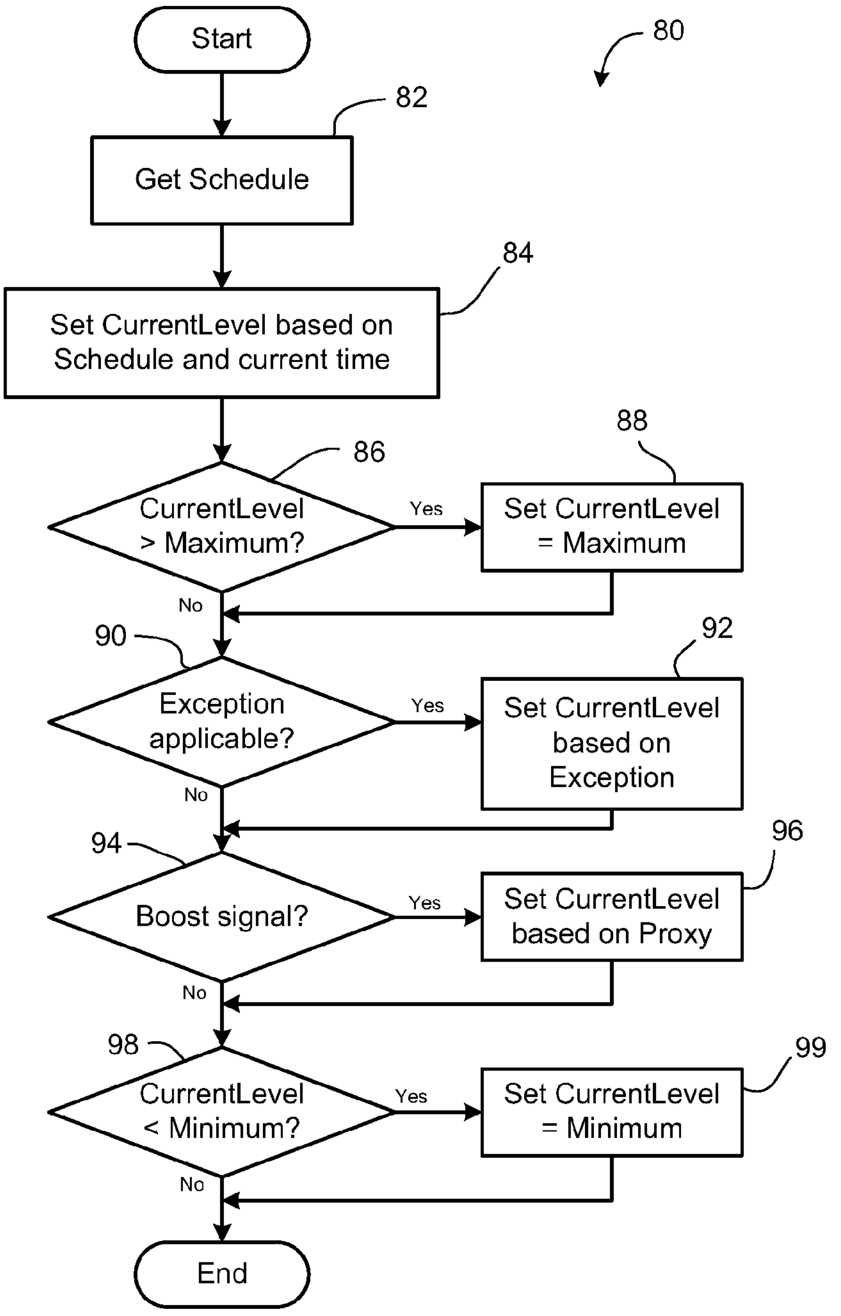
FIG. 4 shows, in flowchart form, an example method for determining or setting the lighting level of a Unit.

Reference is now made to FIG. 4, which shows, in flowchart form, an example method 80 for determining or setting the lighting level of a Unit. In one embodiment, the method 80 may be implemented by way of software operating within the control module 20 (FIG. 1) associated with a specific lighting unit (FIG. 1).

The method 80 represents the setting or determination of the Current Level for a particular Unit. In some embodiments, the control module 20 may perform the method 80 at fixed intervals, such as every second, every ten seconds, etc. In other embodiments, the control module 20 may perform the method 80 based on triggers, such as interrupts or other triggers, set within the control module 20 using time values, like expiry of a duration, or the input of a boost signal. Other possibilities will be appreciated by those skilled in the art.

The method 80 begins in step 82 with retrieval of the Schedule for the particular Unit. The Schedule may be uploaded to memory within the control module 20 during an initialization or start-up phase. The Schedule may be retrieved from memory and, based on the current time, the control module 20 may determine the Scheduled Level for the Unit. In step 84, the Current Level is set to the Scheduled Level.

In step 86, the control module 20 may assess whether the Current Level, i.e. the Scheduled Level, is more than a Maximum prescribed for the Unit. If so, the Current Level is reduced to the Maximum Level in step 88. In another implementation, the Current Level is set to the minimum of the Maximum and the Scheduled Level.

In step 90 the control module 20 determines whether an Exception applies. Typically, this involves comparing current date information with the relevant Exceptions associated with the Unit, to determine whether an Exception applies. If so, then in step 92, the Current Level is set based on the level specified in the Exception. Otherwise, the Current Level remains the same.

In step 94, the control module 20 assesses whether a boost signal applies. The Proxy property corresponding to a Unit may specify a power level and duration for a boost signal. When the boost signal is received, the control module 20 may set the parameter Boost Signal based on the specified power level. The parameter may be reset when the boost condition/duration expires. Accordingly, in step 94, the control module 20 determines whether a boost condition has occurred, meaning the prescribed duration has not expired. If so, then in step 96, the Current Level is set based on the power level prescribed in the Proxy property or by the Boost Level property.

In step 98, the control module 20 may assess whether the Current Level is below a Minimum set for the Unit. If so, then the Current Level is raised to the Minimum in step 99.

The resultant Current Level is then used to construct and issue a command via the lighting control interface 24 to set the dimming level of the Unit. In many embodiments, the previous Current Level may be maintained in memory and instructions only issued through the lighting control interface 24 in the case where there is a change in the Current Level for a Unit.

In some embodiments, it will be appreciated that the parameters, like Boost Level or Scheduled Level, may represent a percentage of the Unit's maximum power. In other embodiments, one or more such parameters may represent a dimming level. For example, a Boost Level of 40 may represent 40% of maximum power in some embodiments, or may represent a dimming factor of 40% from maximum to result in a 60% level of maximum power.

Another example of the method of determining or setting Current Level for a Unit may be represented in pseudo-code as follows:

```
Level=min (Scheduled Level, Maximum)
Level=min (Level, ExceptionLevel)
Level=min (Level, 100−BoostLevel)
CurrentLevel=max (Level, Minimum)
```

In this example, the parameter ExceptionLevel represents the power level specified in an applicable Exception, if any, and the parameter BoostLevel represents the dimming level specified in the Proxy property associated with the Unit, if any.

Based on the foregoing description, other example methods and algorithms for determining the Current Level of a Unit will be appreciated by those skilled in the art.

Overrides

In addition to controlling the lighting units by way of a preprogrammed schedule, the control system 10 permits a user to override the schedule. An override is typically required to turn on lights at a time when the lights are off or dimmed. For example, at night or on weekends a user may require the lights in his or her area in order to continue working. In some existing control systems, the floor may be divided into sections and the user may request, through a user interface, that particular sections be illuminated. The request may be associated with a predefined timeout, such as two hours.

In accordance with an aspect of the present application, the control system 10 includes associations between individual occupants of a building and a set of lighting units within the building. Accordingly, rather than a user selecting a section to illuminate, each occupant is pre-associated with a set of lighting units that correspond to the work areas that the occupant would likely require during an override. This avoids illuminating areas not required by the occupant, thereby saving energy, and it also associates an override instruction with a particular occupant. In one embodiment, it permits association of a timeout for each unit with the intended length of stay for that particular occupant. In some embodiments, a user may also be permitted to submit override requests for areas outside of his or her pre-associated set of lighting units.

Figure 5:
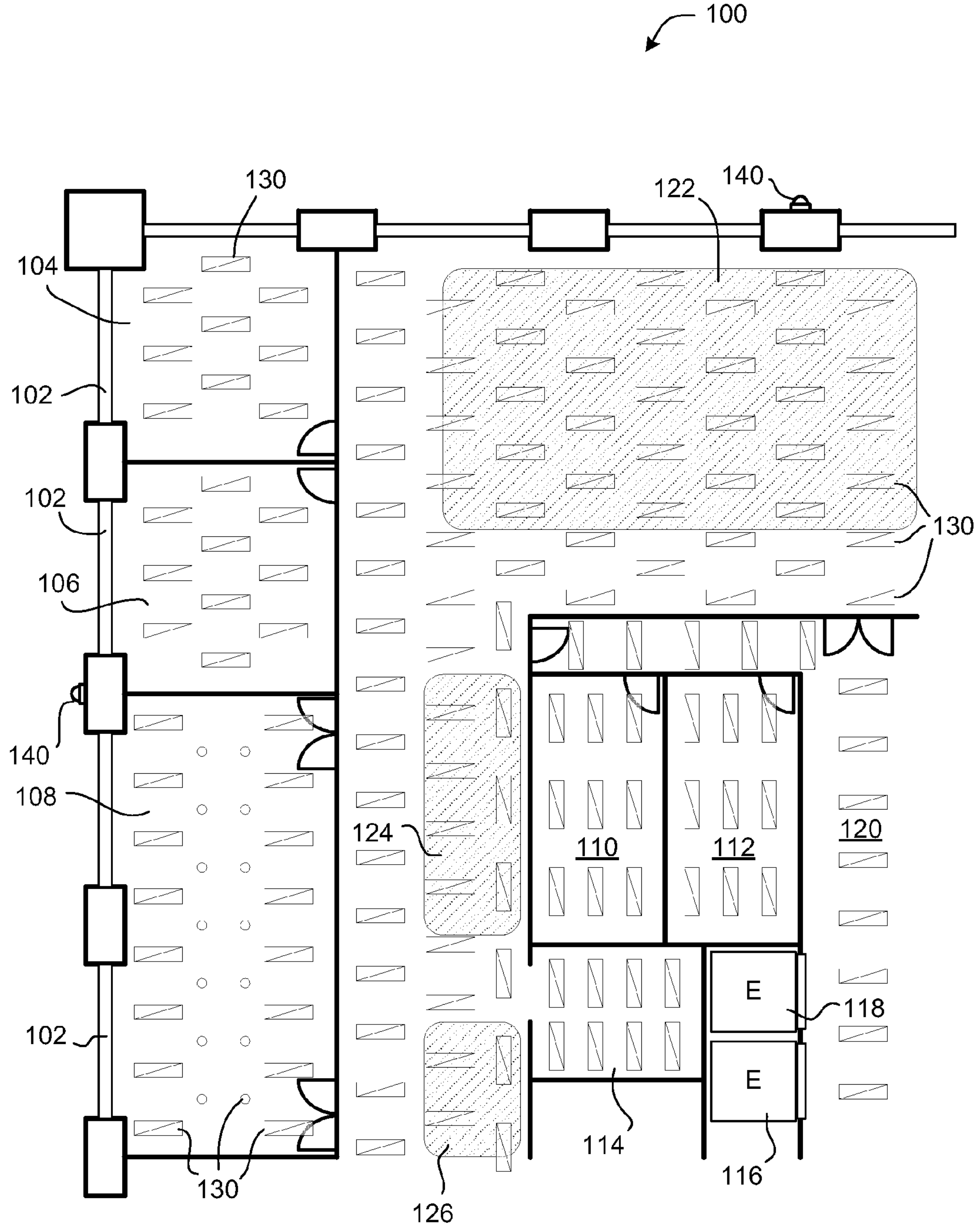
FIG. 5 shows a floorplan for a portion of an example building.

Reference is now made to FIG. 5, which shows a floorplan for a portion of an example building 100. The building 100 includes exterior windows 102. The building 100 also has a number of interior walls dividing the floor into various workspaces. For example, walls may define a first office 104 and a second office 106. The building 100 may also include a boardroom 108 or meeting room, washrooms 110, 112, photocopy centre 114, and interior foyer 120. Access to the floor may be by elevators 116, 118 opening onto the interior foyer 120.

Aside from the offices 104, 106, and other defined spaces detailed above, general workspaces may be defined within the building 100. In practice, the workspaces may include cubicles, lab benches, desks, or other work areas assigned to a set of specific individuals. These workspaces are indicated by shaded areas indicated by reference numerals 122, 124, and 126.

FIG. 5 shows a layout of lighting units overlaid on the floorplan 100, some of which are indicated by reference numeral 130.

A building or floor is typically occupied by a tenant. In the case of industrial or office space, the tenant is usually a corporate employer having a number of employees and contractors that work in the building or floor. In this sense, the tenant is an occupant of the building or floor, and the tenant includes a number of individual occupants.

In accordance with one embodiment of the present invention, each individual occupant of a building or floor is associated with a Work Point. A Work Point is a collection of individual lighting units that may be required by the occupant when accessing the floor or building outside of normal working hours. In one embodiment, the Work Point is made up of one or more Work Cells and one or more Paths. A Work Cell is an area or space that the individual may require to complete a task. A Path is an area or space interconnecting two or more Work Cells or a Work Cell and an exit or entrance. Each Work Cell and Path is made up of a set of lighting units.

Figure 6:
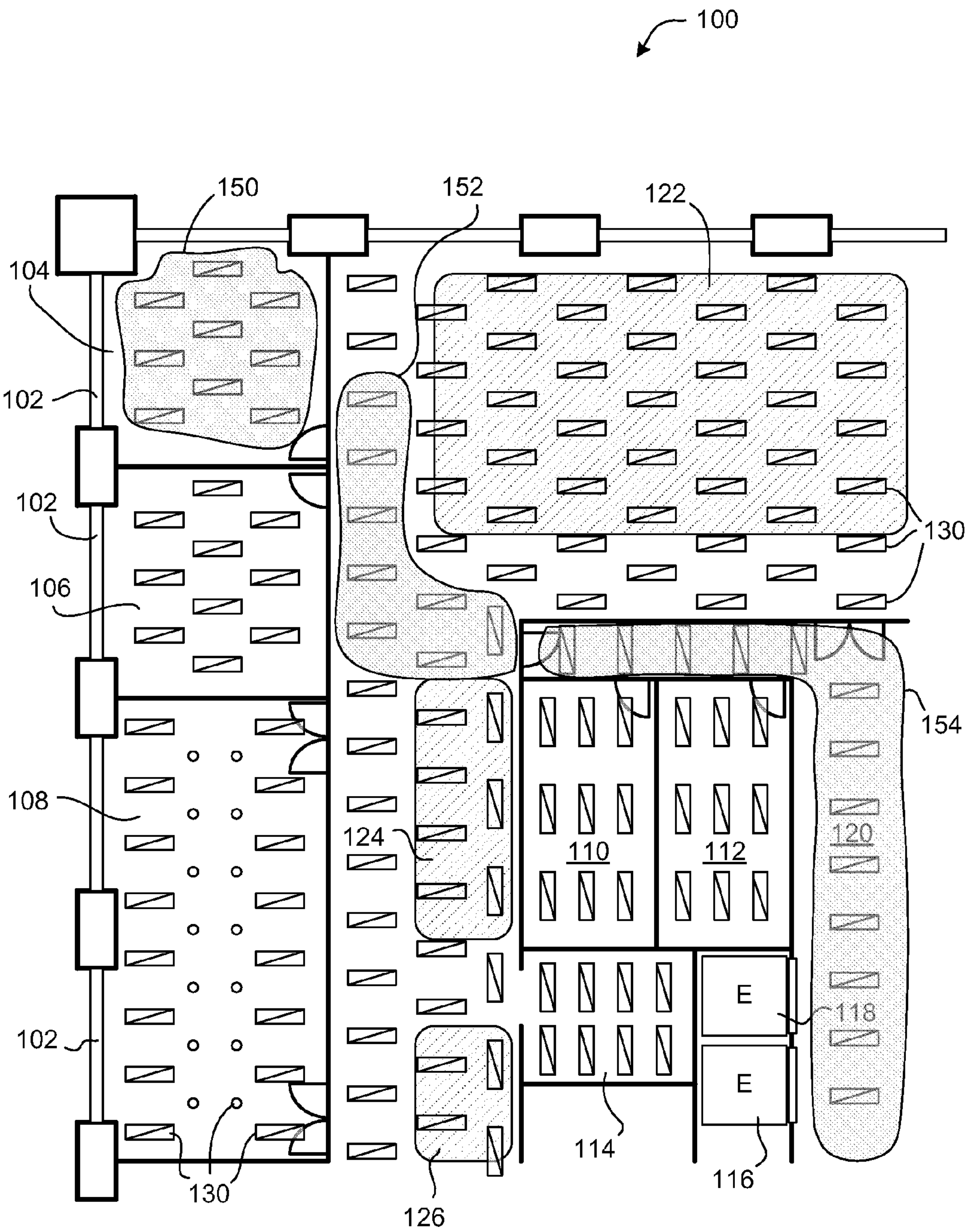
FIG. 6 shows the floorplan of FIG. 5 with an example of a Work Point.

Reference is now made to FIG. 6, which shows the floorplan 100 of FIG. 5. By way of example, a first Work Cell is designated by reference numeral 150 and is defined by the lighting units 130 within the shaded area indicated by numeral 150. A first Path is designated by reference numeral 152 and a second Path is designed by reference numeral 154. Each Path 152, 154 includes the lighting units contained within the corresponding shaded areas shown in FIG. 6. A given occupant, for example the individual that uses the first office 104, may be associated with a Work Point that is made up of the first Work Cell 150 and the first Path 152 and second Path 154.

Within the database 16 (FIG. 1), a record for the occupant may include an association with the Work Point, such as in the form:

| Occupant # | Name | Tenant | Work_Point_1 |
|---|---|---|---|

The Work Point may be defined by a data record detailing the Work Cells and/or Paths that make up the Work Point, such as in the form:

```
Work_Point_1 {
    Work_Cell_1
    Path_1
    Path_2
    }
```

The Work Cells and Paths themselves may be defined by data records specifying the lighting units they include and a light level associated with the override condition:

```
Work_Cell_1 {
    Unit 0298
    Unit 1429
    Unit 1209
    ....
    Unit 2378
    Light Level = 80
    }
Path_1 {
    Unit 0294
    Unit 7612
    Unit 4895
    ....
    Unit 3829
    Light Level = 40
    }
Path_2 {
    Unit 3745
    Unit 7236
    Unit 8437
    ....
    Unit 6745
    Light Level = 40
    }
```

When an occupant inputs an override request, the occupant provides identification information. For example, the occupant may input the request through a concierge, who inputs the occupants name and/or ID number into a user interface to initiate the override request. Alternatively, the occupant may input his or her name or ID number through a user interface to initiate the override request. In another example, the override request may be automatically initiated when the occupant uses his or her magnetic access card to gain entry to the building outside of normal business hours. The building secure access system may supply identifying information to the control system, which may interpret the after-hours access by the occupant as an override request with regard to the lighting system. Other methods and mechanisms for inputting an override request and occupant identifying information will be understood by those skilled in the art.

Based on the occupant identification information, the control system may identify the Work Point associated with the occupant and, thus, the Work Cell(s) and Path(s) associated with the occupant. Based on the Work Cell(s) and Path(s) records, the control system may issue commands to the lighting units designated in those Work Cell(s) and Path(s) records. For example, with regard to example Work_Cell_1 set out above, the control system may instruct the addressable lighting interface to send a command to each lighting unit in the Work_Cell_1 to switch on to 80% of full power. Similarly, each unit in Path_1 and Path_2 may be instructed to switch on to 40% power.

Figure 7:
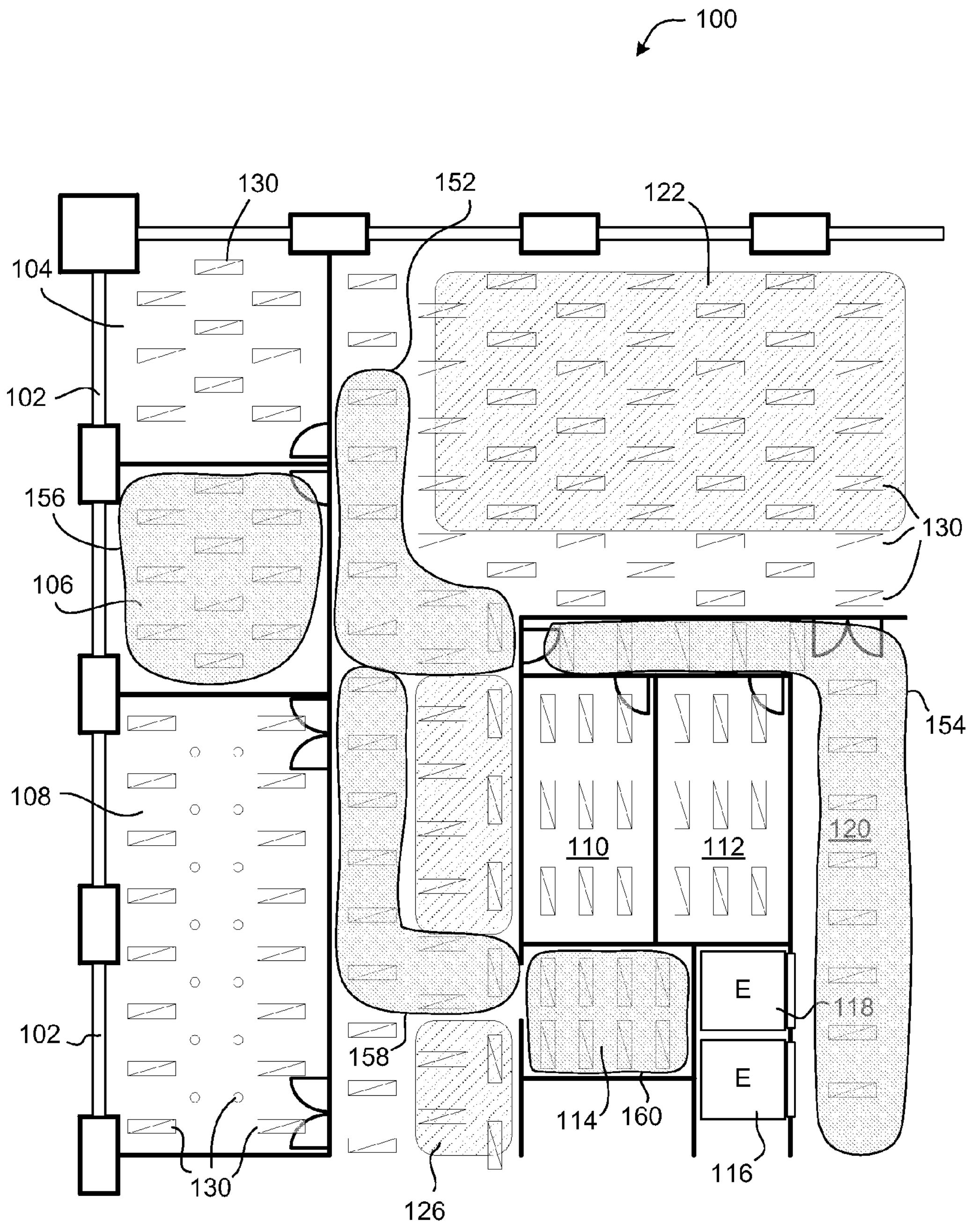
FIG. 7 shows another example of a Work Point with regard to the floorplan of FIG. 5.

Reference is now made to FIG. 7, which shows another example of a Work Point with regard to the floorplan 100 of FIG. 5. In this example, the Work Point includes the first and second Paths 152, 154, a first Work Cell indicated by reference numeral 156, a second Work Cell indicated by reference numeral 160, and a third Path 158. The first Work Cell 156 includes the lighting units within the second office 106. The close proximity of the first office 104 and the second office 106 means that the same Paths 152, 154 may be used to connect the offices 104, 106 to the entrance to the floor at the elevators 116, 118. In this example, the individual occupant may also require access to the photocopy centre 114, so the Work Point includes the second Work Cell 160 within the photocopy centre 114 and the third Path 158 that connects to the second Work Cell 160.

In one embodiment, as exemplified by FIGS. 6 and 7, the Paths and Work Cells are arranged such that each is mutually exclusive. In other words, each lighting unit is a member of only one Path or Work Cell. Work Points for individual occupants may include the same Paths or Work Cells, such as in FIGS. 6 and 7, in which both Work Points include the first and second Paths 152, 154; however, there is no overlap between Work Cells or between Paths.

In some embodiments, the distinction between a Work Cell and a Path may only be relevant insofar as how they are managed during expiry of the override time. In particular, the Path lights may remain illuminated for a short period of time longer than the Work Cell lights. By extinguishing the Work Cell lights first, the user is alerted to the expiry of the override. The Path lights remain at least partially on. If the user does not renew the override request, then the continued illumination of the Paths allow the user sufficient light and time to exit the building or floor.

In one example embodiment, when the override time for an individual occupant expires, half the lights in the Work Cell are extinguished, thereby alerting the user to the expiry of the override, but providing sufficient reduced illumination to allow the user to renew the override request. A short time, such as ten minutes, after the expiry of the override time, the remaining lights in the Work Cell are extinguished. The lighting units in the Path may remain on for a further short period of time, such as an additional ten minutes, before they too are extinguished. It will be appreciated that this effect may be accomplished by pre-establishing the timeouts for each of the lighting units to have this effect; i.e. by having an override time assigned specifically to each unit to reflect the additional time for half the lights in the Work Cell and the lights in the Path. It may also be implemented in other manners, such as by having the override time associated with each Work Cell or Path as the case may be and adjusting the override time to provide for this effect. It may also be implemented by having a single override time and relying upon the subcontroller 14 to recognize each lighting unit's status as member of a Path or Work Cell in determining when to instruct the lighting control interface 24 to extinguish the lighting unit.

Figure 9:
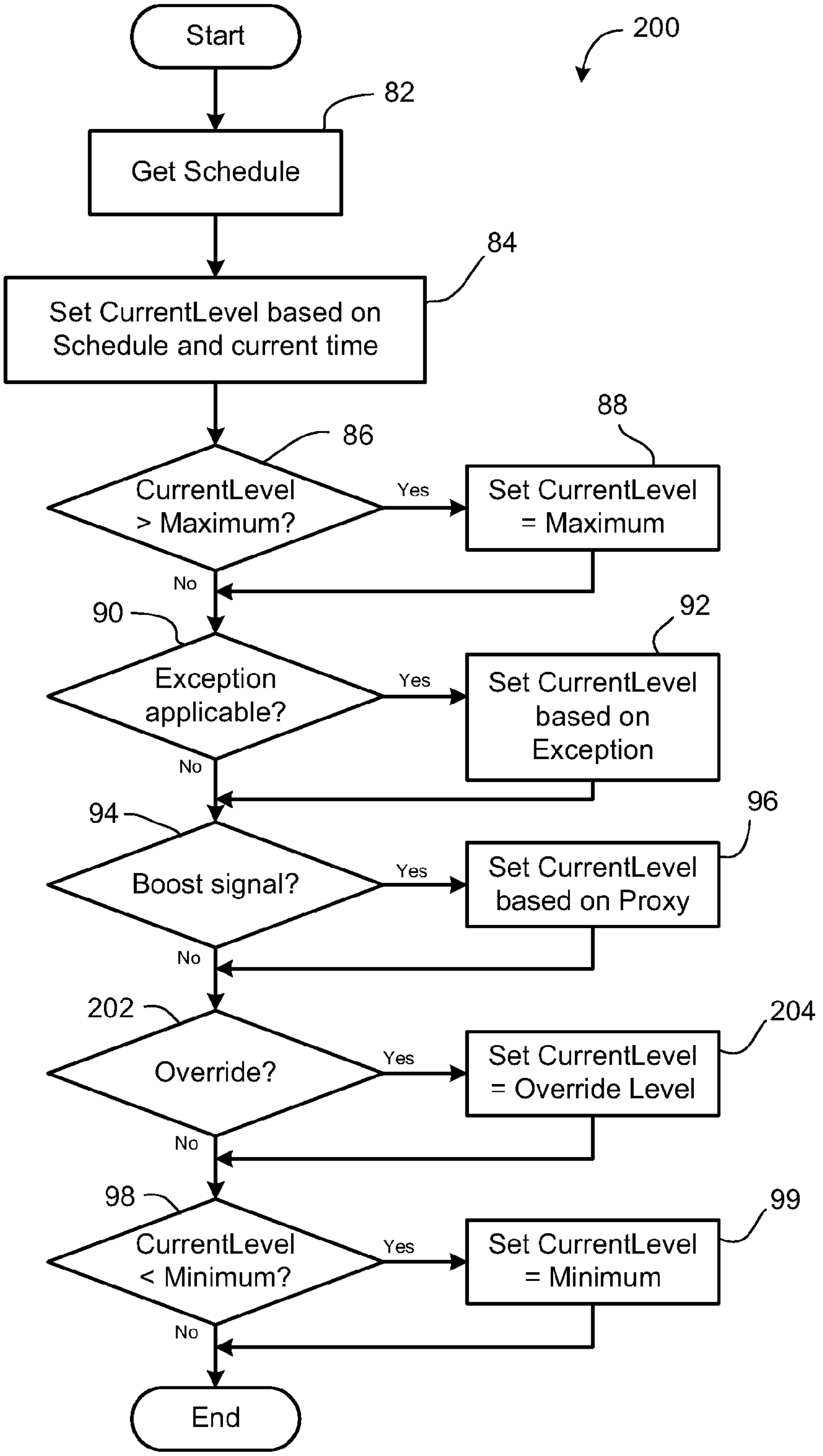
FIG. 9 shows, in flowchart form, another example method for determining or setting the lighting level of a Unit.

Reference is now made to FIG. 9, which shows, in flowchart form, an example method 200 for determining or setting the lighting level of a Unit. The method 200 differs from the method 80 (FIG. 4) in that it includes step 202, in which the control module evaluates whether an override is currently place that is applicable to the Unit. If, in step 202, it is determined that an override condition applies to the Unit, then in step 204 the CurrentLevel is set to the override light level setting defined in the associated Work Path or Cell, as the case may be. In the example method 200 of FIG. 9, an override is only set if the current Schedule indicates that the Units are to be off. Other examples may provide that an override may be put in place even when the Schedule indicates that some or all of the Units are to be on; but that step 204 will only set the CurrentLevel to the Override Level if the Override Level is higher that the CurrentLevel value at step 202.

Figure 8:
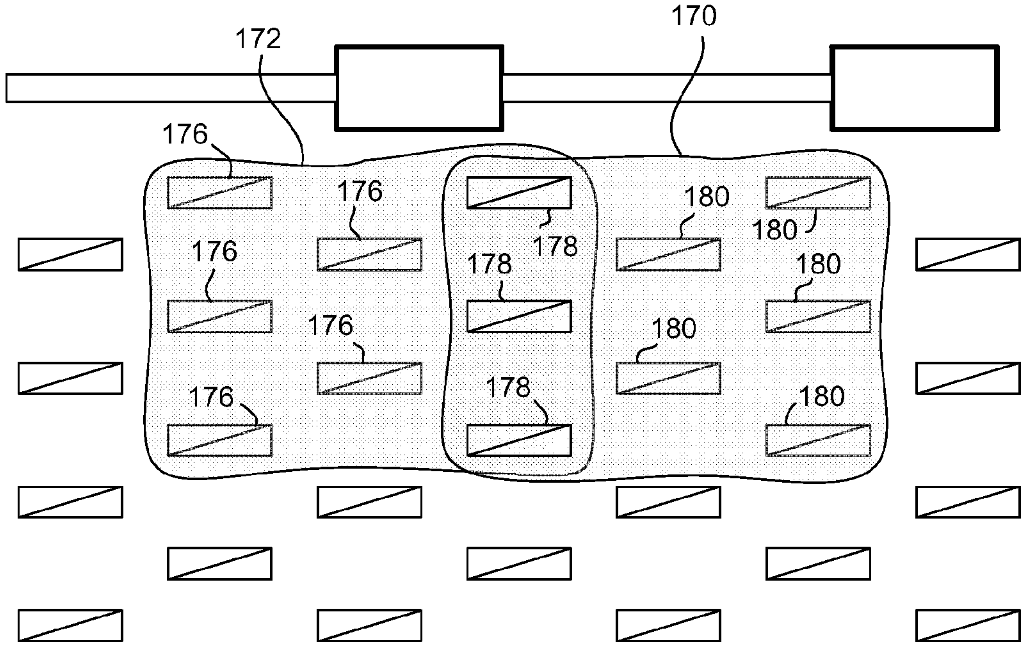
FIG. 8 diagrammatically shows a portion of the floorplan of FIG. 5 with overlapping Work Points.

Reference is now made to FIG. 8, which diagrammatically shows a portion of the floorplan 100 of FIG. 5 with overlapping Work Points. FIG. 8 shows two overlapping Work Cells: a first Work Cell 172 and a second Work Cell 174. The first Work Cell 172 includes lighting units 176, which are only included in the first Work Cell 172, and lighting units 178, which are common to both Cells 172, 174. The second Work Cell 174 includes the common lighting units 178 and a set of lighting units 180 that are only included in the second Work Cell 174.

To facilitate overlapping Work Points, in one embodiment the timeout properties related to an override instruction are transferred to individual Units. When a user inputs an override instruction, the control module populates the timeout parameters for each Unit in the user's Work Point with the appropriate timeout value. In this manner, each Unit has an associated timeout value. If a second user inputs an override that would result in a later timeout, then the Units that are common to both the first user's Work Point and the second user's Work Point will have their associated timeout parameters updated with the later timeout value.

In another embodiment, each Unit has an Event_Counter parameter that tracks how many override requests the Unit is currently subject to. The Event_Counter parameter is incremented each time an override instruction is received that affects the Unit. The timeout value is associated with the user's Work Point. When the timeout value is reached, and the override expires, then the control module turns off any Units within the Work Point that have an Event_Counter set to 1. If a Unit's Event_Counter is 2 or higher, it indicates that other override instructions from other Work Points still apply to those Units, and the control module simply decrements the Event_Counters associated with those Units.

Other mechanisms may also be used to track associations between Units, Work Cells, Paths, Work Points, and override instructions, as will be appreciated by those of ordinary skill in the art.

Figure 10:
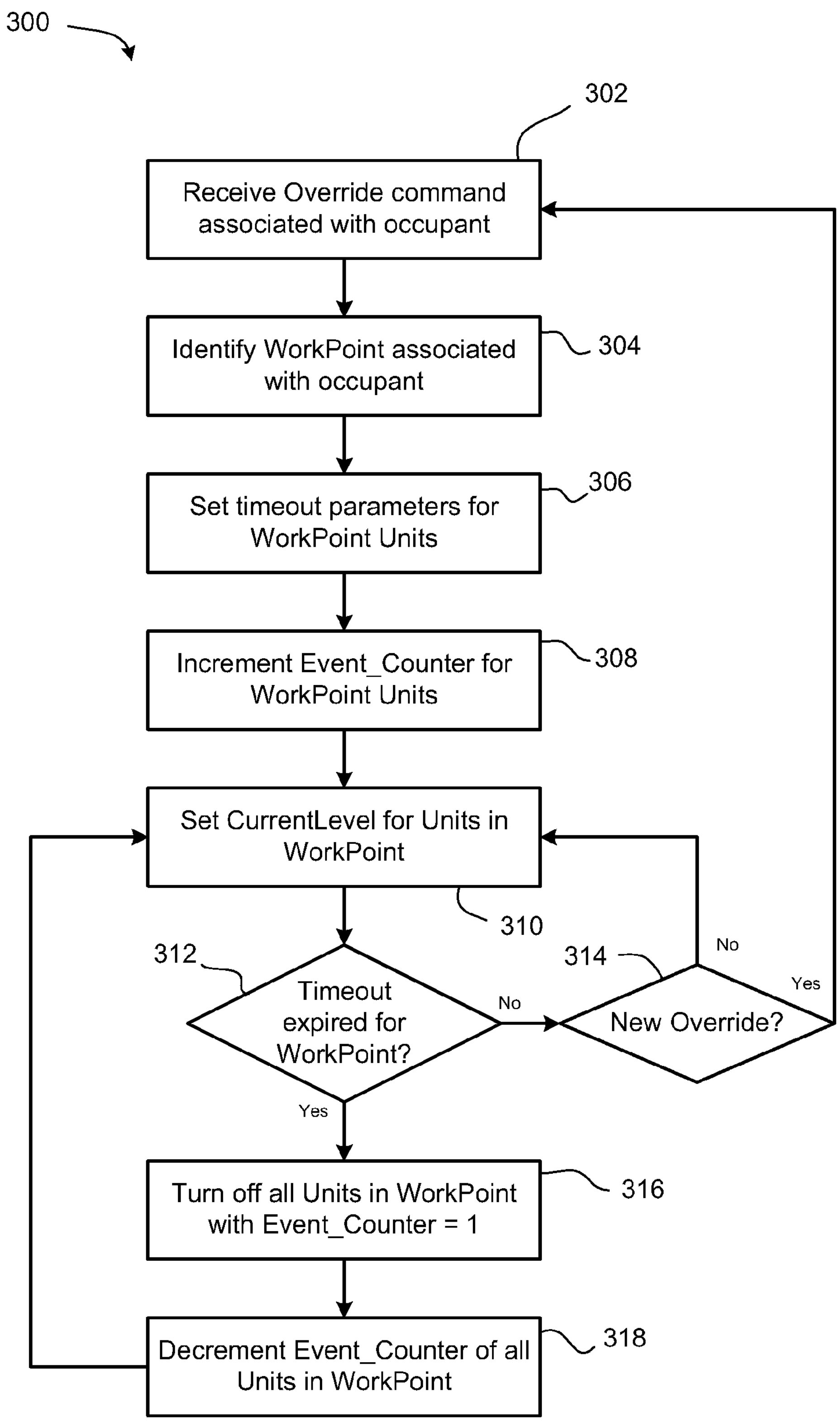
FIG. 10 shows, in flowchart form, an example method for implementing override commands for overlapping Work Points.

To illustrate the operation of overlapping Work Points, reference is now made to FIG. 10, which shows, in flowchart form, an example method 300 for implementing override commands for overlapping Work Points. In setting up the lighting system, it will be appreciated that various Work Cells and Paths are defined and associated with various Units based on the physical layout of the facility within which the lighting system is installed. Work Points made up of Work Cells and Paths are defined and associated with individual occupants.

The method 300 begins in step 302, with receipt of an override instruction. As explained above, the override instruction may be input in a variety of ways, including through a GUI interface, a wireless mobile device, a touch-tone telephone interface, through a concierge, etc. The override instruction may have a default timeout value or may include a user-selected timeout value. The override instruction is associated with a particular individual occupant.

Based on the identity of the particular individual occupant associated with the override instruction, the system identifies the individual occupant's associated Work Point in step 304. In one embodiment, this may involve looking up the associated Work Point in a look-up table or database using an identification number or other identifier specific to the individual occupant. The Work Point data retrieved by the system identifies the Work Cells and Paths, and thus the Units covered by the Work Point, and the override power levels for Units within the Work Cells and Paths. In step 306, the system sets the timeout parameters for the Units within the Work Cells and Paths based on the timeout value received with the override instruction. As noted earlier, the mechanism for setting the timeout value for the various Units may include setting a timeout parameter for each Unit, setting a timeout parameter for the specific Work Cells or Paths, or setting a timeout parameter associated with the Work Point. Any of these specific implementations, or variations or combinations thereof, may be used. In the present example, it will be presumed that the timeout parameter is specific to the Work Point.

In step 308, the Event_Counter parameter for each Unit in the Work Point is incremented.

In step 310, the power levels of all the Units are determined and instructions are sent to those Units that are to be turned on, turned off, or set to a new dimming level. In one embodiment, the setting of the power levels of the Units in step 310 is carried out by way of a method like the method 200 described in connection with FIG. 9.

The system evaluates whether an override has expired in step 312, where it assesses whether a timeout value has expired for a Work Point. If not, then the method 300 continues to step 314, wherein the system assesses whether a new override command has been received. If so, then the method 300 returns to step 302 to implement the new override. If not, then the method 300 cycles back to step 310. In step 310 any changes in the applicable Schedules for the Units, or in received Boost Signals, or other factors, will be reflected in the Current Levels calculated for each Unit. As before, any Units subject to an override instruction have their Current Levels set to their Override Levels.

If, in step 312, a timeout is determined to have expired, then in step 316 all the Units within the Work Point associated with the expired override are turned off, unless they are also subject to another override (for overlapping Work Points). As discussed above, one mechanism for dealing with overlapping Work Points is to rely on the Event_Counter parameter. In particular, in step 316 the system turns off any Units within the Work Point that have an Event_Counter set to 1 and then decrements the Event_Counters of all Units within the Work Point. The method 300 then cycles back to step 310.

It will also be appreciated that, although shown separately, the implementation of a portion of step 316 is accomplished through the method 200 embodied in step 310. For example, the setting of the power level of the Units that are to be turned off to zero may be carried out by virtue of application of the method 200 shown in FIG. 9. When step 202 of the method is reached, those Units that are not subject to a further override and that are within the Work Point of the expired override with not have their Current Levels set to their override levels. Instead their Current Levels may be established by the Scheduled Level, or the Minimum Level, as indicated in method 200. It will be understood that implementation of this condition may mean that step 202 includes an evaluation of whether the Unit's Event_Counter indicates that it is subject to an unexpired override instruction; i.e. that it's Event_Counter is >0. Other mechanisms for determining whether a Unit is still subject to an override and for resetting the power level of Units whose override has expired will be understood by those ordinarily skilled in the art.

Daylight Adjustments

In another aspect, the present application describes a system for controlling addressable lighting units in a facility, where the system is responsive to daylight levels in the environment exterior to the facility.

Many existing systems include light sensors for detecting light levels in the area of a lighting unit and adjusting the power or dimming level of the unit accordingly. The simplest example is a sensor with a threshold. If the sensed light level falls below a threshold, then the lighting unit is turned on. If the light level rises above a (usually different) threshold, then the lighting unit turns off. In some lighting control systems a collection of units may receive direct light sensor input data from a light sensor positioned within a room or area of a building and wired to the units. Based on the light sensor data received, the lighting units may dim their light levels within the room or area of the building.

A light sensor may be configured to a selected light level and provide a feedback signal that indicates if the sensed light level is above or below the selected light level. The control system may be configured to adjust the dimming levels of units in the area of the sensor to reach the selected light level.

Reference is again made to FIG. 1 and FIG. 5. As noted above, the subcontrollers 14 may have input ports connected to one or more sensors 30. As illustrated in FIG. 5, one of the sensors may include an exterior light sensor 140. The exterior light sensor 140 is positioned so as to sense the ambient light level outside the building or facility. For example, the light sensor 140 may be mounted to an exterior wall of the building, as illustrated in FIG. 5. Multiple light sensors 140 may be used, each positioned on a different side of the building, for example.

The light sensors 140 are positioned so as to provide data indicative of the light levels incident on the windows 102 of the building. Based on these light levels, the control modules 20 may make an assessment of the exterior daylight intensity and consequent adjustments to the dimming levels of the lighting units. The light sensors 140 may be hardwired into the lighting control system. In some other embodiments, they may be battery operated and may communicate wirelessly with a receiver connected to the lighting control system.

Each of the lighting units has an associated daylight saving weight (DSW) property. The DSW property describes the behavior of the unit in response to the exterior light levels. The DSW property for each unit is preset depending on the physical layout of the building and its proximity to sources of natural light, e.g. the windows. For example, those units that are located adjacent to a window may have a DSW property that is highly responsive to exterior light levels, indicating the unit should be aggressively dimmed when exterior light levels are intense. Other units, like those in work space 124, are located a fair distance from a window 102 and may receive little natural light. These units may have a DSW property set to be less responsive to exterior light levels. A unit with little or no exposure to natural light sources, like a unit located in the interior foyer 120 or one of the washrooms 110, 112, may have a DSW parameter that is non-responsive to exterior light levels.

In one embodiment, for simplicity, the light levels sensed by exterior light sensors 140 are quantized by the control module 20, and the DSW properties are based on the quantization scheme. For example, exterior light may be quantized into five levels: DARK, FLAT, CLEAR, BRIGHT, INTENSELY BRIGHT. These terms are but one example; other terminology may be used, and fewer or more levels of quantization may be used. Using this example, a unit may have a DSW property associated with light sensor [L1] as follows:

DSW=[0 10 30 60 75]

The DSW indicates the dimming factor—the percentage of full power by which the unit should be dimmed under the five conditions. For example, if the scheduled power level of the unit is 80% of full power, and the exterior light sensor L1 indicates the daylight condition as BRIGHT, then the DSW indicates that, under the light conditions, the unit should be reduced to 100−60=40% of full power. If the light sensor L1 indicates that the daylight condition is FLAT, then the DSW would result in a setting of 90% of full power, meaning that the resulting power level will be the 80% of full power, since it is the lowest level prescribed by the Schedule.

In another embodiment, in addition to the exterior light sensor 140, the system includes an interior sensor. The interior sensor provides data indicative of the status of blinds on the windows. In one example embodiment, the interior sensor is a mechanical or electromechanical sensor that direct senses whether the blinds are closed or open, or, in some cases, the degree to which the blinds are closed. In another example embodiment, the interior sensor is a light sensor that provides a reading of the interior light levels which, when compared to the exterior light levels read by the exterior light sensor 140, indirectly indicates the status of the blinds. The data from the interior sensor, and thus the status of the blinds, allows the control system to apply a correction factor to the DSW property that would otherwise be selected based on the exterior light conditions. In other words, the DSW properties are based on having fully opened blinds. The correction factor adjusts the DSW based on the blind status. For example, if the exterior light conditions would result in dimming a unit by 60% and the blind status is determined to be partly closed, then the dimming may be adjusted by a correction factor of, e.g., 0.5, for a resultant dimming of 30%. It will be appreciated that the precise correction factors may be application dependent.

Figure 11:
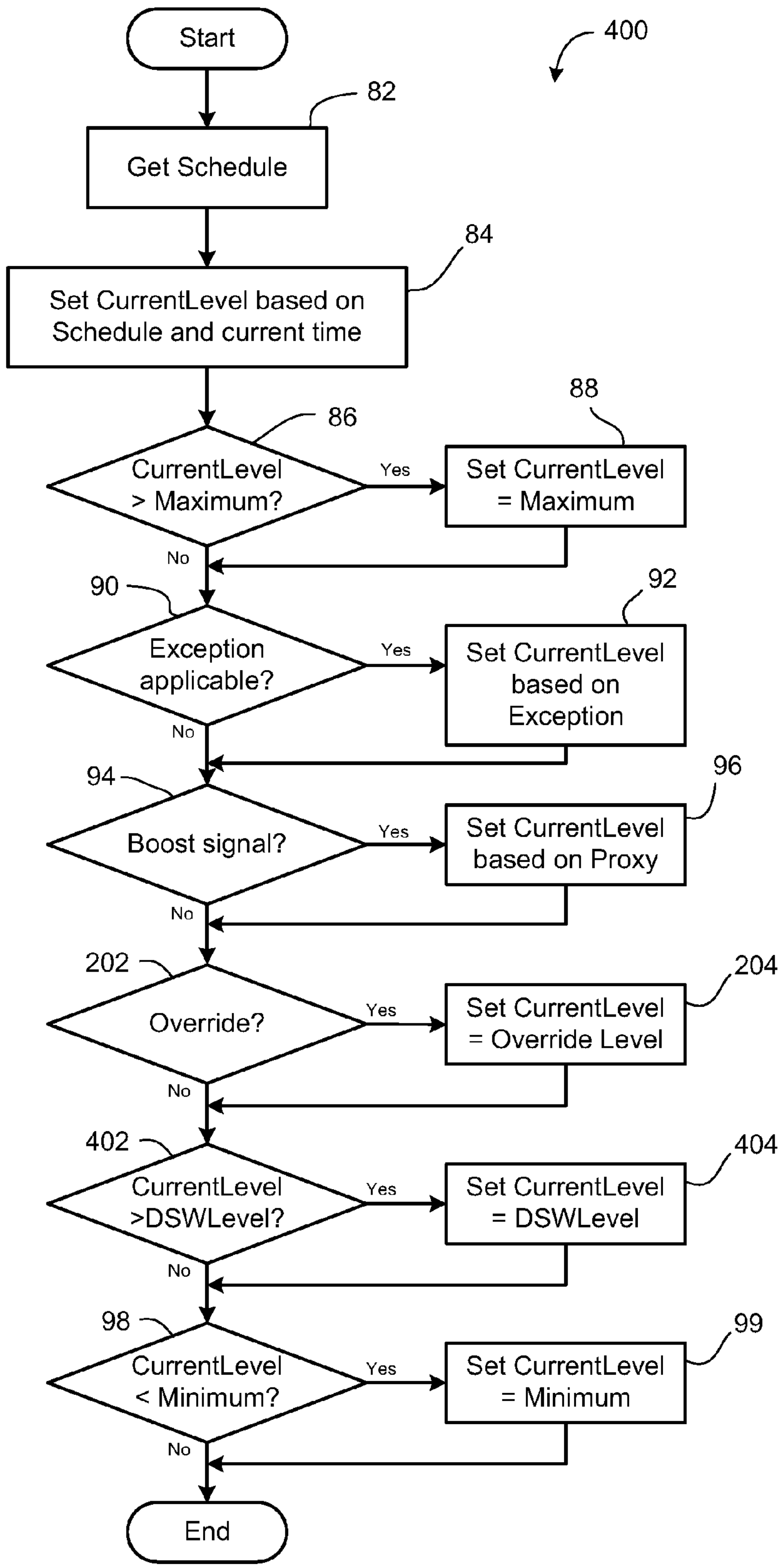
FIG. 11 shows, in flowchart form, a further example method for determining or setting the lighting level of a Unit.

Reference is made to FIG. 11, which shows, in flowchart form, an example method 400 for determining or setting the lighting level of a Unit. The example method 400 is similar to the example methods 80 and 200 depicted in FIGS. 4 and 9, respectively; however, the method 400 also applies the DSW property of the Unit.

The steps of method 400 are similar to the steps of method 200. The CurrentLevel of the Unit is governed by the Scheduled Level, subject to any Exceptions, as indicated in steps 84, 90, and 92. If, in the result, the Unit is off or significantly dimmed, then it may have its CurrentLevel increased if it is subject to a Boost signal (steps 94, 96) or an Override command (steps 202, 204).

Then, in step 402, the CurrentLevel is then assessed against the level prescribed by the DSW property for the Unit. Based on the light sensor data, an exterior light condition is identified by the control module 20. As explained above, the DSW property for the Unit assigns a dimming level for each exterior light condition. The dimming level, or DSWLevel, indicates the level to which the Unit should be dimmed given the light conditions. In step 402, the control module assesses whether the CurrentLevel is higher than the level prescribed by the DSW property. If it is already lower, then the method 400 continues to step 98.

Otherwise, in step 404, the CurrentLevel is adjusted down to the DSWLevel prescribed by the DSW property for the current exterior light conditions.

It will be appreciated that the above embodiments of a lighting control system use one or more exterior sensors to obtain an indication of the exterior light conditions. Adjustments to each individual unit in response to the exterior light conditions are made based on a DSW property preset for each unit, where the DSW property is partly based on the proximity of the unit to sources of natural light, such as windows. It will be appreciated that this configuration and method avoids the cost associated with using a plurality of light sensors in every interior location in an attempt to sense the actual interior light levels in various areas of the building, and to make adjustments to groups of units accordingly.

It will also be appreciated that one or more interior sensors may be used to determine the status of blinds, if any, and that the status of the blinds may be used to apply correction factors to the DSW properties.

Conservation Demand Management

In many parts of the world, electric power is growing increasingly expensive and unreliable. Environmental concerns with coal fired generators and with alternatives, like nuclear power, have resulted in an undersupply of electrical energy sources. The consequence is that many electric utilities have difficulty meeting energy demands from consumers on the grid at peak usage times. This occurs most frequently in the heat of the summer months as air conditioning demands cause an increase in electrical energy usage. Rotating brown-outs and black-outs have become a fact of life in some areas.

As a result, it has become common for electrical utilities to reach agreements with large corporate consumers regarding load shedding. When a utility experiences an excessive demand it can issue a request to some consumers to reduce their demand so as to avoid a blackout in the system. In practice, in the case of a building with a number of lighting units, this process may include an incoming request from a utility that the building reduce its electrical demand by a fixed amount or percentage, or a request that the building indicate the amount by which it can reduce its demand. Personnel in the building may be charged with responsibility for determining the amount by which the building can reduce demand, and for then implementing that decrease. In some cases, this may include simply dimming all lighting units in the building by some percentage. The dimming of lighting units may be effected by inputting a command to the lighting control system to dim all units by a fixed or percentage amount. In some cases, it may be effected by inputting a command to turn off various lighting units. This action may be termed "load shedding".

In one aspect, the lighting control system of the present application is preconfigured to assist with optimizing the load shedding operation with minimal annoyance to users in the building.

Each Unit is assigned a load shedding weight (LSW) property. The LSW property indicates the extent to which the unit may be dimmed depending on the seriousness of the conservation demand. The seriousness of the conservation demand may be viewed as escalating levels of electric supply emergency, from a low-level soft request up to a critical command. Any number of levels of quantization may be specified. In one example embodiment, six different conservation demand levels are assigned. Level 1 corresponds to a low level non-critical conservation demand, under which moderate reduction of demand may be made but nothing that would significantly annoy or inconvenience the building's occupants. Level 6 corresponds to a critical emergency conservation demand, under which drastic load reduction is required and a noticeable drop in light levels will be apparent to the occupants. The conservation demand level indicates the severity of the impact of the demand reduction being imposed on the lighting system.

The LSW property for each unit indicates the Unit's minimum power level for a specific conservation demand level. By way of example, three lighting units may have the following respective LSW properties:

U1 LSW=[1 80] [2 60] [4 40] [6 0]
U2 LSW=[1 80] [4 40] [5 0]
U3 LSW=[1 50] [2 20] [4 0]

The example LSW properties indicate that a conservation demand at level 1 would result in 80% dimming of units U1 and U2 and a 50% dimming of unit U3. At level 2, unit U1 could be further dimmed to 60% and unit U3 could be further dimmed to 20%. At level 3, no changes would result, and at level 4 both U1 and U2 could be dimmed to 40% while unit U3 could be extinguished. Unit U2 can be extinguished at level 5 and unit U1 can be extinguished at level 6.

Accordingly, the level of the conservation demand determines the load shedding action for each Unit in the lighting control system. Less critical units, like unit U3, can be dimmed and turned off under lesser emergencies, while more important units like U1 may offer less dimming and may not be turned off unless a truly critical emergency arises. In one aspect, this permits a building administrator to select a conservation demand command that reflects the significance of the emergency.

Referring again to FIG. 1, in one embodiment the database 16, or another memory within the system 10, may include a grouping of units into Areas, based on commonalties in LSW properties. Areas do not refer to the unit's location, but rather to a set of units that share an LSW property. For example, an Area may be defined to include all those units having the property [1 80]. Areas may be used for assessing and implementing conservation demand management functions. Using the example given above for three units, the following Areas may be defined:

AREA1 [1 80]=U1, U2
AREA2 [1 50]=U3
AREA3 [2 60]=U1
AREA4 [2 20]=U3
AREA5 [4 40]=U1, U2
AREA6 [4 0]=U3
AREA7 [5 0]=U2
AREA8 [6 0]=U1

The system 10 may include a conservation demand management (CDM) module 19. The CDM module 19 may retrieve or search Area data within the database 16 or other memory in order to identify units affected by a potential conservation demand command. The CDM module 19 may also query and obtain data regarding the Current Levels of Units affected by the potential command from the subcontrollers 14 (through the daemons 22). Based on the Current Levels and the LSW of the Area, the CDM module 19 may determine the impact of a potential command on overall demand of the system 10. For example, the CDM module 19 may be configured to calculate the reduction in energy usage that would result if a conservation demand were issued at level 5 versus level 4. It may present these results to a user, for example through the GUI display 18 or a remote user terminal 32, who may then select an appropriate command. In another embodiment, the CDM module 19 may determine the command level required to obtain a particular energy savings. For example, a user may request a load reduction of a certain number of kilowatts, or a percentage of current use, and the CDM module 19 may determine the energy savings available from a level 1 command, a level 2 command, etc. until it identifies a command level sufficient to achieve the requested load reduction.

In a building, or group of buildings, the system 10 may have a number of subcontrollers 14 each with hundreds of lighting units, meaning that the system 10 includes thousands of units all with unique LSW properties. By predefining Areas that list the units having common LSW properties, the centralized CDM module 19 is capable of quickly requesting or retrieving Current Level information from each unit listed in an Area having a certain LSW property, meaning that the CDM module 19 can assess the "available" shedding that would be achieved by implementing that level of conservation demand command. Alternatively, the CDM module 19 must perform a scan of all units to identify those units that would be affected by a particular conservation demand command and the extent to which implementation of the command would reduce energy demands of each unit.

Figure 12:
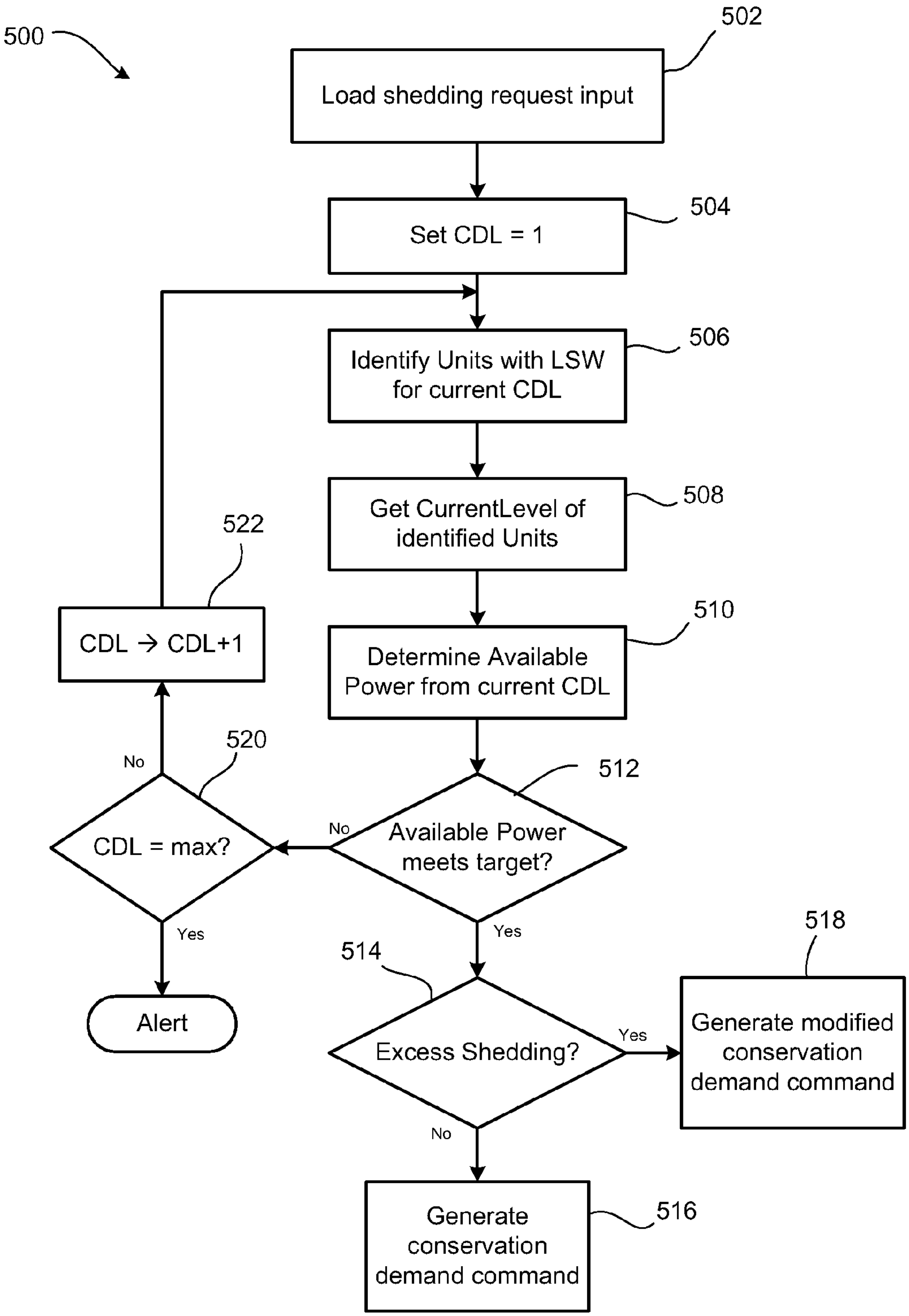
FIG. 12 shows, in flowchart form, a method of conservation demand management with respect to a lighting system.

Reference is now made to FIG. 12, which shows, in flowchart form, a method 500 of conservation demand management with respect to a lighting system. The method 500 begins in step 502 with receipt of load shedding request. The load shedding request may include load shedding criteria. The criteria may, for example, specify a target number of watts by which demand should be reduced. Alternatively, the criteria may specify a percentage of current usage by which demand should be reduced. Other criteria may be used or specified. The load shedding request may be received by the system 10 (FIG. 1) by way of a load shedding request command input by a user through the GUI display 18, a remote user terminal 32 or through any other user interface to the system 10.

As noted above, the load shedding request input to the system in step 502 may be directly or indirectly based on a conservation demand request received from a power authority. The conservation demand request from a power authority may in some cases specify a number of watts to be shed. In these circumstances, the method 500 may be applied to determine the conservation demand level necessary to achieve the desired load shedding. In some other cases, the power authority may request an indication of the number of watts that the building complex is willing to shed. In these cases, the method 500 may be applied so as to determine the number of load shedding watts available at the various conservation demand levels.

In some embodiments, once the method 500 determines the conservation demand level required to achieve a desired or target reduction the method 500 may then implement conservation demand instructions, with or without further user instructions or confirmation.

It will be appreciated that in some embodiments the method 500 is largely implemented through the CDM module 19 (FIG. 1). The CDM module 19 may be a suitably configured software program, application, process, or other construct for carrying out the steps and operations described above within the environment of the system 10. Nevertheless, it will be understood that the method 500 need not by implemented as the CDM module 19 shown in FIG. 1 and may be implemented elsewhere in the system 10 as part of another component or software program.

After the load shedding request is input in step 502, the CDM module sets the conservation demand level (CDL) to 1 in step 504, indicating the lowest level of conservation demand emergency. In one embodiment, the module also clears an accumulator variable (ACC).

In step 506 the CDM module identifies Units that have LSWs containing a parameter for the current CDL. In an embodiment in which Units are organized into Areas, the CDM module searches the Areas to identify those Areas that relate to the current CDL. For example, at CDL=1, the CDM module identifies all Areas that relate to level 1. In the example given earlier, this includes AREA1 and AREA2. The identified Areas contain a list of units having a parameter within their LSWs that relates to the current CDL.

In step 508, the CDM module obtains the CurrentLevel for each Unit identified in step 506. The CurrentLevel for each Unit may be obtained from the subcontrollers 14 to which the Units belong. In many cases, the CurrentLevel data may be stored locally in memory at the subcontrollers 14. In some other cases, the subcontrollers 14 may update the database 16 regularly with CurrentLevel data for each Unit. The precise model depends on the architecture of the overall system 10. In any event, the CDM module retrieves the CurrentLevel and the maximum or capacity level for each Unit.

In step 510, the CDM module determines what effect the current CDL would have on each Unit's power use. In particular, the LSW for the Unit (or Area, if the Units are grouped into Areas), specifies a particular reduction from maximum for the given CDL. For example, it may specify that at CDL=1 the Unit should be set to 80% of full power. The CurrentLevel indicates the current power level of the Unit. Due to the current Schedule, or an Override, or an Exception, or Daylight Savings Weight, the CurrentLevel may be higher or lower than the level that might be achieved through a conservation demand instruction at the current CDL. Accordingly, in step 510, for each Unit the CDM module determines how much of a power saving would be available. Each Unit's available load shedding at the current CDL may be expressed as:

$$\mathrm{AvailPower}(\mathrm{Unit}(n,\mathrm{CDL}))=\mathrm{CurrentLevel}(\mathrm{Unit}(n))-[\mathrm{LSW}(\mathrm{Unit}(n),\mathrm{CDL})\times\mathrm{MaxPower}(\mathrm{Unit}(n))]$$

The available power (AvailPower) for a given Unit at the current CDL is the difference between the CurrentLevel of the Unit and the level that would result from application of the CDL. The latter "resultant" power is the LSW of the Unit at the current CDL times the Unit's maximum or capacity power.

If the available power is negative, because the CurrentLevel is already lower than the level that would result from application of the CDL, then the calculation for that Unit may be ignored. This might occur if the Unit is subject to Daylight Savings Weight, or if the Unit is subject to an Exception, or if the Scheduled level is simply lower than the CDL level, or through other factors. In calculating the CurrentLevel, for example using a variant of the method 80 of FIG. 4, or the method 200 of FIG. 9, or the method 400 of FIG. 11, the lower power level (e.g. due to the Schedule, the Exception, or the Daylight Savings Weight) will govern the determination of CurrentLevel even if the current CDL is implemented by way of a conservation demand command.

If the available power is positive, then the CDM module notes the power available. In one embodiment, the CDM module adds the available power to the accumulator (ACC) variable. As the CDM module calculates the available power for each unit, it continues to add the calculated available power to the accumulator. After all Units have been assessed, then the accumulator contains the power available from implementing the current CDL. In some embodiments, the CDM module may then display this total to a user, for example through the GUI display 18.

To the extent that load shedding criteria were specified with input of the load shedding request in step 502, the CDM module assesses whether those criteria are met by the current CDL in step 512. In particular, the CDM module may compare the available power specified in the accumulator with the requested or target load shedding. If the available power meets or exceeds the target, then the criteria are met. If the available power from the current CDL is insufficient to meet the target, then the criteria are not met.

If the load shedding criteria are met at the current CDL, then the method 500 proceeds to step 514 where it assesses whether the current CDL results in excess shedding, i.e. if the available power is greater than the target. In some embodiments, a threshold may be prescribed under which the difference is considered negligible. If the available power is essentially the same as the target or requested load shedding, then in step 516 the CDM module may implement the load shedding by issued a conservation demand instruction at the current CDL. The affected Units are then dimmed in accordance with the CDL and their LSWs.

If there is excess shedding identified in step 514, then in step 518 the CDM module may generate a modified conservation demand instruction to try to eliminate the excess. For example, based on the ratio of the target dimming to the available load shedding the CDM module may identify the percentage of the available load shedding required to meet the target. It may then generate a conservation demand command that includes the percentage, and the Units may be dimmed by their specific LSW for the current CDL multiplied by the percentage. For example, if the method 500 is used to reach a target load shedding of 100 kW, and the available power at CDL=2 is 80 kW and the available power at CDL=3 is 120 kW, then the CDM module may issue a conservation demand command instructing the Units to dim to their CDL=3 power level*83.3% (=100/120). In this example, a Unit with a LSW=[1 80] [2 70] [3 40] [5 0] would dim to 50% of full power since at CDL=3 the LSW indicates the Unit should dim by 60% from full power to a power level of 40%, but the modified conservation demand command indicates only 83.3% of the dimming is required. Accordingly, the power level for the Unit is set to (full power*100%−((100-40)*0.833) %).

Step 518 may alternatively include other modifications to the conservation demand command in an attempt to reduce excess shedding. For example, the conservation demand command may only be applied to a subset of Areas or floors or Units, which are selected on the basis that they will provide the target amount of load shedding. Other variations will be understood by those skilled in the art. In some cases, the method 500 may not include any modified commands, and steps 514 and 518 may be eliminated.

If, in step 512, it is found that the calculated available power from the current CDL is insufficient to meet the target load shedding, then the method 500 proceeds to step 520, where it assesses whether the CDL is at a maximum emergency level (e.g. level 6, in one embodiment). If so, then the target amount of load shedding is unavailable from any level of emergency conservation action and an alert may be issued to an operator or user. The maximum emergency level load shedding may or may not be implemented at this time to achieve whatever load shedding is available despite the fact it does not meet the load shedding criteria.

If the CDL has not reached its maximum level, then the CDL is incremented in step 522. The method 500 then returns to step 506 and again determines the available power from load shedding, but this time with the new CDL. In this manner, the method 500 proceeds to until it determines the CDL that will result in a load shedding that meets the target.

In one embodiment, following step 512, even when the CDM module determines that the current CDL provides insufficient power demand reduction to meet the target, the CDM module implements the current CDL. In other words, if the method 500 determines that CDL=1 provides insufficient load shedding, it still results in a conservation demand command at CDL=1, to cause the relevant Units to dim to their LSW at CDL=1. The method 500 then returns to step 506 to determine whether the additional power savings from CDL=2 would be sufficient to meet the target. In this embodiment, the target is reduced by the amount of available power achieved by way of the conservation demand command at the current CDL. For example, if the target reduction is 100 kW and CDL=1 results in available power savings of 60 kW, then a command is issued to reduce demand in accordance with CDL=1, the relevant Units are dimmed accordingly meaning that their CurrentLevels reflect CDL=1, the target is reset to 40 kW, and the method 500 is repeated to determine whether moving to CDL=2 supplies the necessary additional 40 kW of power savings.

Other implementations and variations will be appreciated by those of ordinary skill in the art. For example, those skilled in the art may appreciate that in some instances various steps described in the methods above may be rearranged and performed in an alternative order, or may be combined or performed contemporaneously. In some instances, steps may be omitted or supplemented with additional steps. The precise implementation of each method depends, in part, upon the architecture of the system and the nomenclature, organization, and structure of the data records for the Units selected for a particular installation.

The above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method to control addressable lighting units in one or more buildings, the method comprising:

identifying an individual accessing the one or more buildings;

associating the individual with a work point, the work point comprising a collection of individual lighting units required by the individual when accessing a location outside of working hours;

determining from the work point at least two work cells associated with the individual in the one or more buildings, each of the two work cells comprising an area that the individual may access in the one or more buildings;

generate a work cell definition comprising at least one work cell lighting instruction for a first set of addressable lighting units associated with one or all of the at least two work cells;

determining a work path comprising an area that connects the at least two work cells;

generating a work path definition comprising at least one work path lighting instruction for a second set of addressable lighting units associated with the work path, wherein the first set of addressable lighting units are different than the second set of addressable lighting units; and activating the first and second sets of addressable lighting units located in the at least two work cells and the work path according to the work cell definition and the work path definition.

2. The method of claim 1, further comprising modifying the work cell lighting instruction for the at least two work cells or the at least one work path lighting instruction for the work path according to an override command, wherein the override command comprises sending a command to operate at an override power level to the first set of addressable lighting units or the second set of addressable lighting units.

3. The method of claim 1, further comprising determining a plurality of second work path definitions or a plurality of second work cell definitions.

4. The method of claim 1, wherein the work cell lighting instruction for the one or more lighting units associated with the work cell comprises an override power level having a shorter time than the at least one work path lighting instruction for the one or more lighting units in an area associated with the work path.

5. The method of claim 1, wherein the work cell lighting instruction for the one or more lighting units associated with the work cell or the at least one work path lighting instruction for the one or more lighting units associated with the work path comprises specified times, a level for the one or more lighting units associated with the work path or the work cell, and a scheduled level for the one or more lighting units associated with the work path or the work cell.

6. The method of claim 5, further comprising setting the one or more lighting units associated with the work path or the work cell according to the scheduled level for the one or more lighting units associated with the work path or the work cell.

7. The method of claim 1, further comprising receiving an override request to override the work cell lighting instruction or the at least one work path lighting instruction, wherein the override request causes the one or more lighting units associated with the work path or the work cell to be illuminated at an override level.

8. The method of claim 7, wherein the override request comprises a time to override the work cell lighting instruction or the at least one work path lighting instruction.

9. The method of claim 7, further comprising receiving an override renewal request to renew the override request.

10. The method of claim 1, further comprising determining one or more common lighting units associated with first set of addressable lighting units and the second set of addressable lighting units.

11. The method of claim 10, further comprising modifying the work path or the work cell definition for the one or more common lighting units to include a timeout property associated with an override request of one of the one or more common lighting units.

12. The method of claim 11, wherein the timeout property comprises a timeout value whereby when the timeout value is reached, the method further comprises determining if a second override request is pending using an event counter configured to track how many override requests the one or more common lighting units are subject to;

in response to a determination that a second override request is pending, operate under the second override request; and in response to a determination that a second override request is not pending, operate under the work path definition and the work cell definition.

13. A system for controlling addressable lighting units within a building, the system comprising:

a memory device to store an identification of an individual accessing the building;

an identification of at least two work cells associated with the individual in the building, each of the two work cells comprising an area that the individual may access in the building outside of working hours;

a work cell definition comprising at least one work cell lighting instruction for a first set of addressable lighting units associated with one or all of the at least two work cells, an identification of a work path comprising an area that connects the at least two work cells;

a work path definition comprising at least one work path lighting instruction for a second set of addressable lighting units associated with the work path wherein the first set of addressable lighting units are different than the second set of addressable lighting units;

a work point definition comprising the work path definition and the work cell definition;

and a controller programmed to activate the first and second sets of addressable lighting units located in the at least two work cells and the work path according to the work cell definition and the work path definition.

14. The system of claim 13, wherein the memory also stores a plurality of second work point definitions associated with a plurality of second individuals.

15. The system of claim 14, wherein the controller is configured to determine using an event counter if an override request for a lighting unit is pending for one of the second work point definitions when an override request for a lighting unit for the work point definition expires.

16. The system of claim 13, wherein the controller is configured to receive an override request from the individual comprising an override power level.

17. The system of claim 16, wherein the override request is shorter when associated with the work cell as compared to the work path.

* * * * *